US012632701B2

(12) United States Patent
Au et al.

(10) Patent No.: US 12,632,701 B2
(45) Date of Patent: May 19, 2026

(54) GLOBAL INTERPRETATION OF GRAPH LEARNING EXPLAINABILITY BASED ON CUMULATIVE DENOISING AND CLUSTERED SEARCH

(71) Applicant: Fujitsu Limited, Kawasaki (JP)

(72) Inventors: Wing Yee Au, Saratoga, CA (US);
Kanji Uchino, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 121 days.

(21) Appl. No.: 18/597,756

(22) Filed: Mar. 6, 2024

(65) Prior Publication Data

US 2025/0284929 A1 Sep. 11, 2025

(51) Int. Cl.
G06N 3/045 (2023.01)
G06T 11/26 (2026.01)

(52) U.S. Cl.
CPC .............. G06N 3/045 (2023.01); G06T 11/26 (2026.01)

(58) Field of Classification Search
CPC ............ G06N 3/045; G06N 3/00; G06N 5/01; G06N 5/02; G06N 5/022; G06N 5/045; G06N 20/00; G06N 20/20; G06T 11/26; G06F 16/9024; G06F 16/906
See application file for complete search history.

(56) References Cited

U.S. PATENT DOCUMENTS

| | | | | |
|---|---|---|---|---|
| 10,796,391 B2 * | 10/2020 | Grom | .............. | G06Q 10/06375 |
| 2007/0046671 A1 * | 3/2007 | Iguchi | ................. | G06F 3/04847 |
| | | | | 345/440 |
| 2015/0243059 A1 * | 8/2015 | Matange | ............... | G06T 11/206 |
| | | | | 345/440 |

FOREIGN PATENT DOCUMENTS

| | | | | |
|---|---|---|---|---|
| CN | 110222822 A | * | 9/2019 | ............... G06N 3/08 |
| CN | 113378062 A | * | 9/2021 | ............. G06N 3/048 |

OTHER PUBLICATIONS

Smith, Lucy; Alhub. "#ICLR2022 Invited Talk Round-Up 2: Beyond Interpretability." Alhub, May 6, 2022, https://aihub.org/2022/05/06/iclr2022-invited-talk-round-up-2-beyond-interpretability/: 5 pp.

Yuan, Hao, et al.; "Explainability in graph neural networks: A taxonomic survey." IEEE transactions on pattern analysis and machine intelligence 45.5 (2022): pp. 5782-5799.

(Continued)

*Primary Examiner* — Jeffery A Brier

(74) *Attorney, Agent, or Firm* — Fujitsu Intellectual Property Center; Tiep H. Nguyen

(57) ABSTRACT

In an embodiment, operations include receiving a dataset including a set of graphs, applying a graph explainer model on the dataset to determine explain scores, and filtering graph elements of each graph based on the explain scores to determine a first set of graph elements. Further, another dataset of randomized graphs is generated. The graph explainer model is applied on the other dataset to determine noise scores, which are used determine denoised explain scores from the explain scores. Graph elements of each graph are filtered based on the denoised explain scores to determine a second set of graph elements. Thereafter, feature vectors are determined for the first set of graph elements and the second set of graph elements, and prediction driving graph elements are determined based on the feature vectors. Explainability information associated with the set of graphs is rendered, based on the prediction driving graph elements.

20 Claims, 13 Drawing Sheets

(56)　　　　　　　References Cited

OTHER PUBLICATIONS

Krishna, Satyapriya, et al.; "The disagreement problem in explainable machine learning: A practitioner's perspective." arXiv preprint arXiv:2202.01602 (2022): 34 pp.

Lundberg, Scott M., et al.; "From local explanations to global understanding with explainable AI for trees." Nature machine intelligence 2.1 (2020): pp. 56-67.

EPO,"Extended European Search Report" mailed in connection with corresponding application No. EP25160566.3, dated Jul. 1, 2025: 10 pp.

Azzolin, Steve, et al.; "Global explainability of gnns via logic combination of learned concepts." arXiv preprint arXiv:2210.07147 (2022): 19 pp.

* cited by examiner

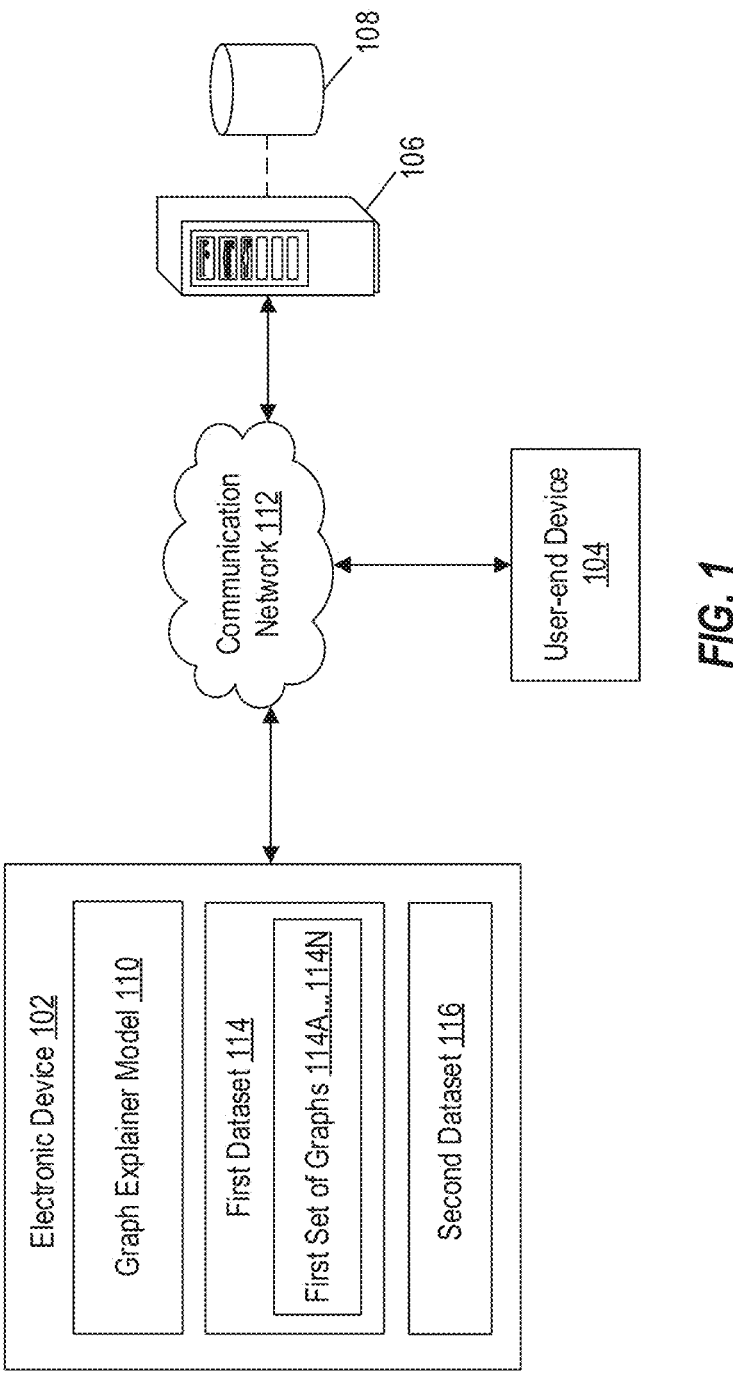
*FIG. 1*

200

400

Select first graph from first set of graphs 402

Execute first set of operations on selected first graph to determine first subset of explain scores, and first subset of graph elements of first set of graph elements that belong to selected first graph 404

Determine predefined number of subsets of initial explain scores based on applications of graph explainer model on predictions generated on selected first graph, where each initial explain score in each subset of initial explain scores of predefined number of subsets of initial explain scores is associated with graph element of selected first graph 404A Normalize initial explain scores in each subset of initial explain scores of predefined number of subsets of initial explain scores 404B Perform accumulation of normalized initial explain scores associated with each graph element in predefined number of subsets of initial explain scores to obtain first subset of explain scores of set of explain scores 404C Sort explain scores in first subset of explain scores 404D Determine slope associated with sorted explain scores 404E Identify inflection point associated with sorted explain scores for which determined slope is beyond positive threshold slope 404F Identify graph elements beyond identified inflection point as first subset of graph elements of first set of graph elements 404G Determine whether first set of graphs includes at least one unprocessed graph 404H Re-select second graph from first set of graphs, as selected first graph, based on first set of graph including at least one unprocessed graph 404I Obtain set of explain scores and first set of graph elements based on iterative execution of first set of operations until first set of graphs does not include any unprocessed graph 406

*FIG. 4*

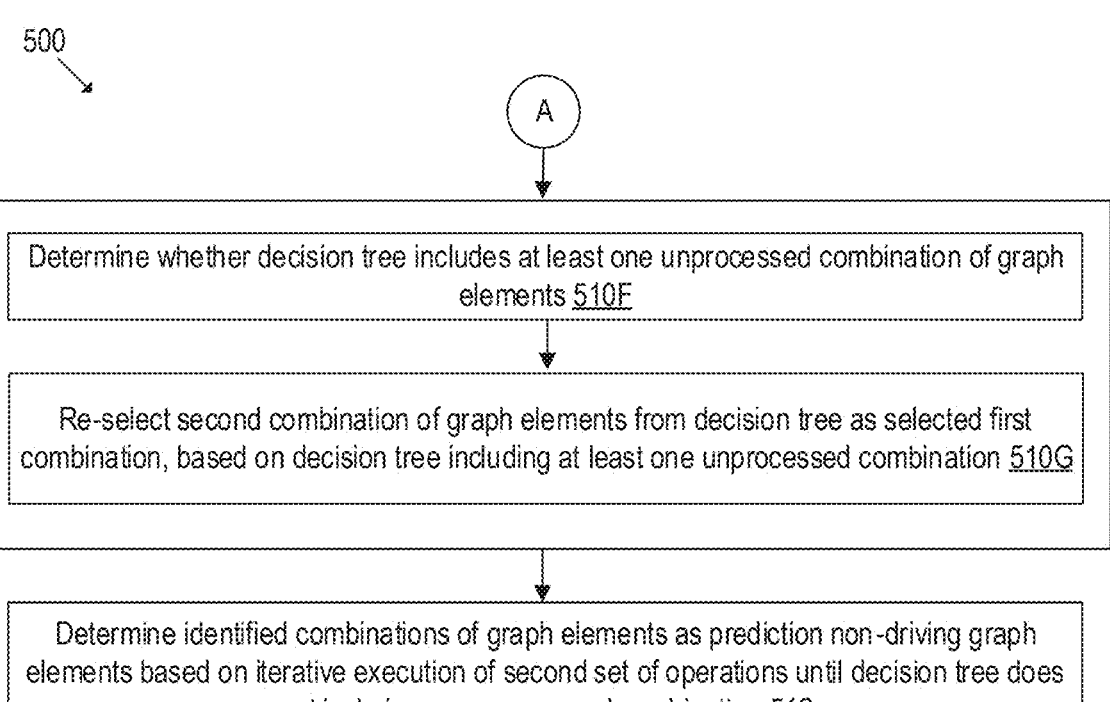

500

A

Determine whether decision tree includes at least one unprocessed combination of graph elements <u>510F</u>

Re-select second combination of graph elements from decision tree as selected first combination, based on decision tree including at least one unprocessed combination <u>510G</u>

Determine identified combinations of graph elements as prediction non-driving graph elements based on iterative execution of second set of operations until decision tree does not include any unprocessed combination <u>512</u>

*FIG. 5B*

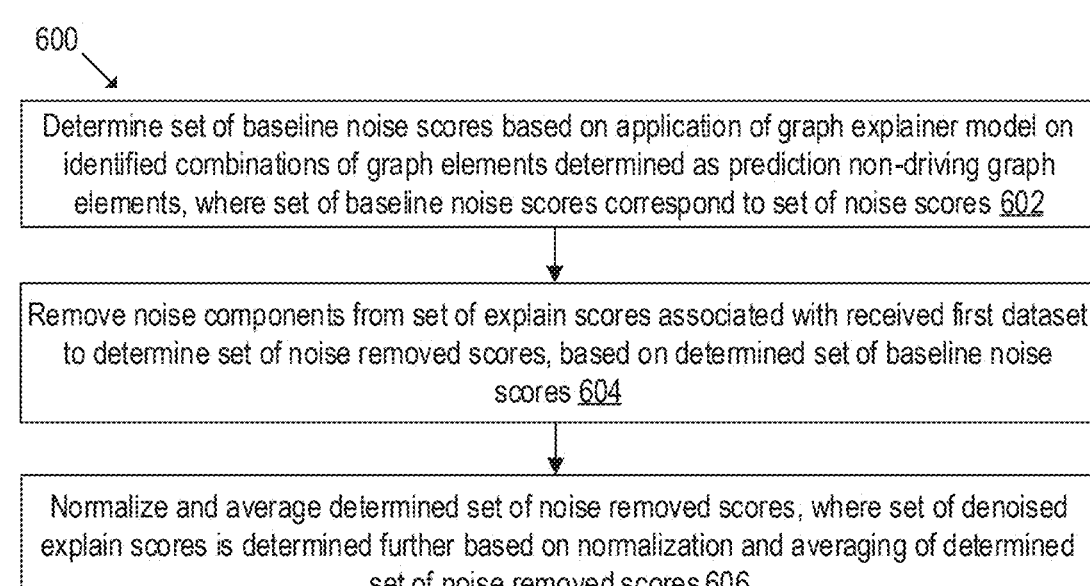

600

Determine set of baseline noise scores based on application of graph explainer model on identified combinations of graph elements determined as prediction non-driving graph elements, where set of baseline noise scores correspond to set of noise scores <u>602</u>

Remove noise components from set of explain scores associated with received first dataset to determine set of noise removed scores, based on determined set of baseline noise scores <u>604</u>

Normalize and average determined set of noise removed scores, where set of denoised explain scores is determined further based on normalization and averaging of determined set of noise removed scores <u>606</u>

*FIG. 6*

700

| Determine set of feature vector clusters including feature vectors of first set of feature vectors and second set of feature vectors 702 |
| --- |

↓

| Determine set of vector components that are common to first feature vector cluster of set of feature vector clusters, where set of prediction driving graph elements is determined further based on determined set of vector components 704 |
| --- |

| Annotate each prediction driving graph element of determined set of prediction driving elements associated with each graph of first set of graphs 802 |
| --- |

↓

| Render graph data including explainability information associated with first set of graphs 804 |
| --- |

| Determine global explainability metric associated with each graph of first set of graphs, where determination of global explainability metrics is based on determined cosine similarity metric 902 |
| --- |

↓

| Generate a group of similar graphs of first set of graphs based on determined global explainability metric, where graph data is rendered further based on generated group of similar graphs 904 |
| --- |

*FIG. 9*

1100

---

Display electronic user interface (UI) that comprises one or more UI elements corresponding to graph data including explainability information associated with plurality of graphs 1102

---

Receive, via displayed electronic UI, first user input indicative of user-selection of first set of graphs from plurality of graphs 1104

---

Receive first dataset including first set of graphs 1106

---

Apply graph explainer model on received first dataset to determine set of explain scores 1108

---

Filter graph elements of each graph of first set of graphs, to determine first set of graph elements, based on determined set of explain scores 1110

---

Generate second dataset including set of randomized graphs, based on first set of graphs 1112

---

Apply graph explainer model on generated second dataset to determine set of noise scores 1114

---

Denoise determined set of explain scores based on determined set of noise scores 1116

---

Filter graph elements of each graph of first set of graphs, to determine second set of graph elements, based on determined set of denoised explain scores 1118

---

Determine first set of feature vectors for determined first set of graph elements 1120

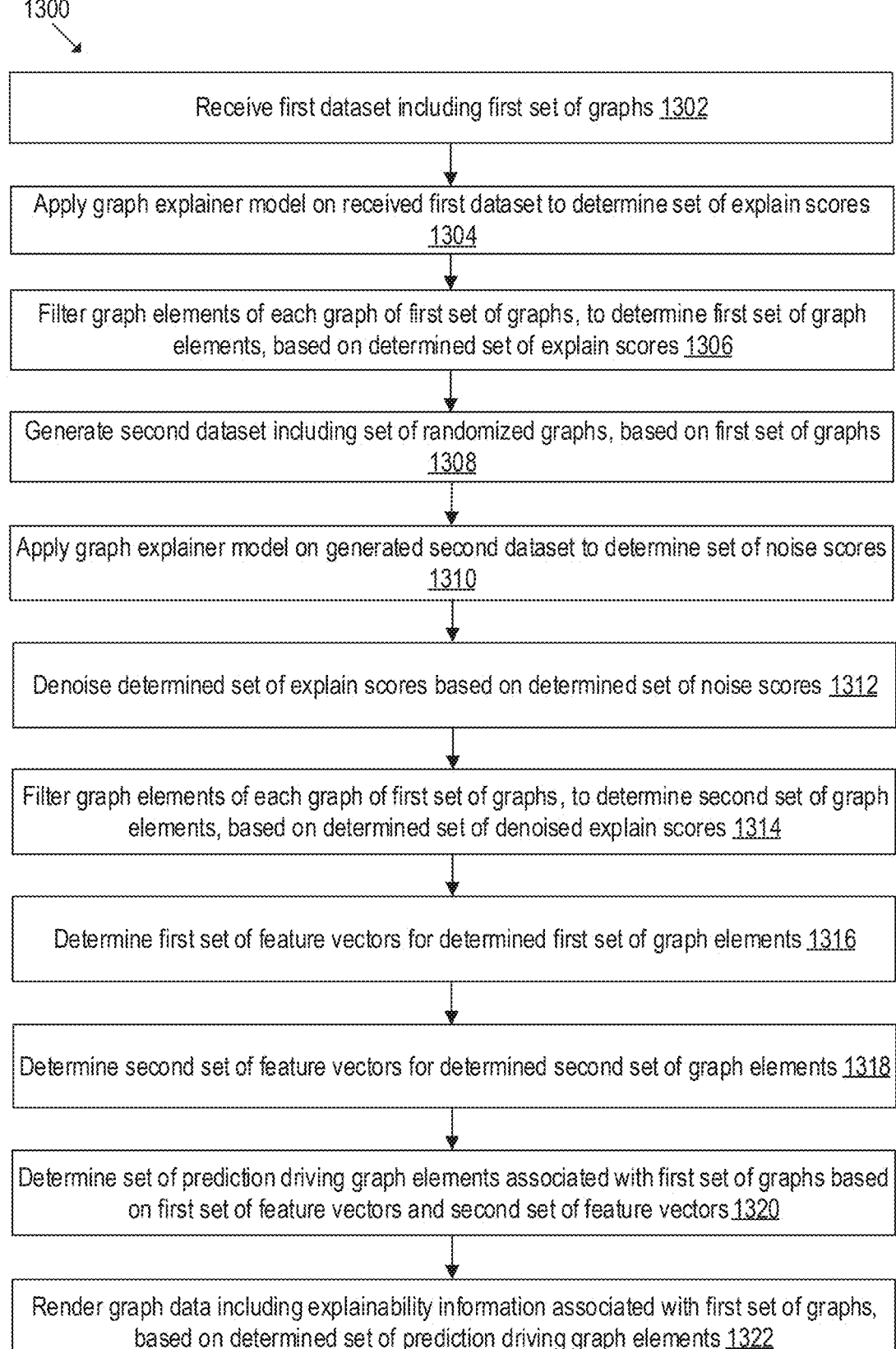

Receive first dataset including first set of graphs 1302

Apply graph explainer model on received first dataset to determine set of explain scores 1304

Filter graph elements of each graph of first set of graphs, to determine first set of graph elements, based on determined set of explain scores 1306

Generate second dataset including set of randomized graphs, based on first set of graphs 1308

Apply graph explainer model on generated second dataset to determine set of noise scores 1310

Denoise determined set of explain scores based on determined set of noise scores 1312

Filter graph elements of each graph of first set of graphs, to determine second set of graph elements, based on determined set of denoised explain scores 1314

Determine first set of feature vectors for determined first set of graph elements 1316

Determine second set of feature vectors for determined second set of graph elements 1318

Determine set of prediction driving graph elements associated with first set of graphs based on first set of feature vectors and second set of feature vectors 1320

Render graph data including explainability information associated with first set of graphs, based on determined set of prediction driving graph elements 1322

*FIG. 13*

GLOBAL INTERPRETATION OF GRAPH LEARNING EXPLAINABILITY BASED ON CUMULATIVE DENOISING AND CLUSTERED SEARCH

FIELD

The embodiments discussed in the present disclosure are related to global interpretation of graph learning explainability based on cumulative denoising and clustered search.

BACKGROUND

Advancements in the field of explainable graph machine learning have led to development of explainable graph machine learning models that may have a capability to generate explanations for predictions generated by a graph neural network on input graph data. The explanations may ensure that the generated predictions are transparent, trustworthy, ethical, fair and interpretable by humans. The explanations may further allow end-users to comprehend or deduce the reasoning behind the predictions. In some scenarios, the explanations may allow expert users to determine whether the generated predictions are influenced due to inductive bias, overfitting, under-fitting, or data drift, of a neural network-based graph machine learning model and whether the generated predictions are to be accepted or rejected. The explanations for the predictions may be of critical importance, particularly for predictions associated with application areas such as, finance-related forecasting, transactional fraud detection, entertainment, product recommendation, and so on.

Typically, opaque models (such as, a neural network-based explainable graph machine learning model) may generate an explanation for a generated prediction as a post-processing step. The explanation may be generated after the generation of the prediction. Such a post-hoc operation (i.e., the generation of the explanation after the prediction) may result in an explanation (for a prediction) that may be inconclusive. This may be due to an incorrect or a partial detection of elements (such as, nodes, edges, or graph structures) in input graph data that may influence an output prediction. Further, the neural network-based explainable graph machine learning model may generate explanations on a localized basis, i.e., an explanation may be generated for each prediction in silo. The localized interpretation of explanations may be subject to a confirmation bias, thereby affecting the transparency of the predictions. Furthermore, an explanation for a prediction may differ significantly from other explanations for other predictions, even if the predictions are generated based on the same input graph data.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving a first dataset including a first set of graphs. The set of operations may further include applying a graph explainer model on the received first dataset to determine a set of explain scores. The set of operations may further include filtering graph elements of each graph of the first set of graphs to determine a first set of graph elements, based on the determined set of explain scores. The set of operations may further include generating a second dataset including a set of randomized graphs based on the first set of graphs. The set of operations may further include applying the graph explainer model on the generated second dataset to determine a set of noise scores. The set of operations may further include denoising the determined set of explain scores to determine a set of denoised explain scores, based on the determined set of noise scores. The set of operations may further include filtering graph elements of each graph of the first set of graphs to determine a second set of graph elements based on the determined set of denoised explain scores. The set of operations may further include determining a first set of feature vectors for the determined first set of graph elements. The set of operations may further include determining a second set of feature vectors for the determined second set of graph elements. The set of operations may further include determining a set of prediction driving graph elements associated with the first set of graphs based on the first set of feature vectors and the second set of feature vectors. The set of operations may further include rendering graph data including explainability information associated with the first set of graphs, based on the determined set of prediction driving graph elements.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1 is a diagram representing an example network environment related to global interpretation of graph learning explainability based on cumulative denoising and clustered search;

FIG. 4 is a diagram that illustrates a flowchart of an example method for determination of a set of prediction driving graph elements in a graph dataset based on explain scores;

FIGS. 5A and 5B are diagrams that collectively illustrate a flowchart of an example method for determination of graph elements in a graph dataset that may not be driving predictions;

FIG. 6 is a diagram that illustrates a flowchart of an example method for determination of a denoised explain scores based on a set of noise scores;

FIG. 7 is a diagram that illustrates a flowchart of an example method for determination of a set of prediction driving graph elements based on feature vectors of graph elements;

FIG. 8 is a diagram that illustrates a flowchart of an example method for rendering of explainability information associated with a graph dataset;

FIG. 9 is a diagram that illustrates a flowchart of an example method for determination of a global explainability metric for global interpretation of explainability information associated with predictions on a graph dataset;

FIGS. 11A and 11B are diagrams that collectively illustrate a flowchart of an example method for global interpretation and visualization of graph explainability results;

FIG. 13 is a diagram that illustrates a flowchart of an example method for global interpretation of graph learning explainability based on cumulative denoising and clustered search;

Figure 2:
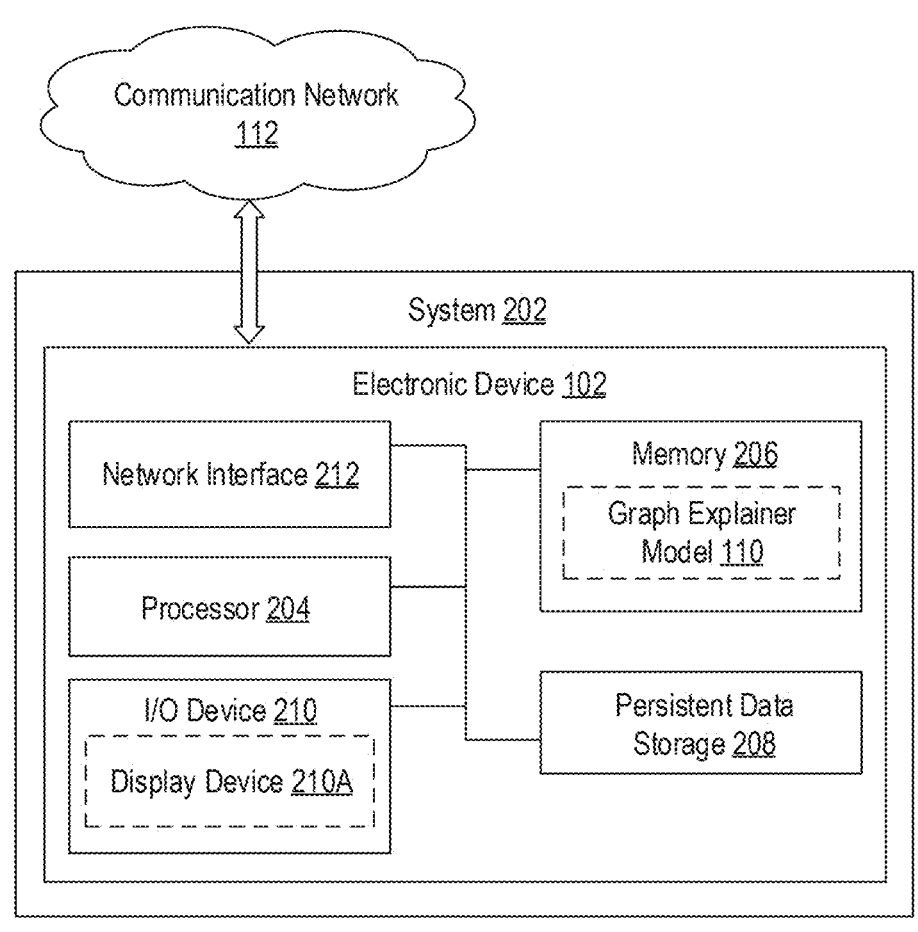
FIG. 2 is a block diagram that illustrates an exemplary electronic device for global interpretation of graph learning explainability based on cumulative denoising and clustered search.

all according to at least one embodiment described in the present disclosure.

DESCRIPTION OF EMBODIMENTS

Some embodiments described in the present disclosure relate to methods and systems for global interpretation of graph learning explainability based on cumulative denoising and clustered search. Herein, the global interpretation of graph learning explainability may involve reception of a first dataset including a first set of graphs. Further, a graph explainer model may be applied on the received first dataset to determine a set of explain scores. Further, graph elements of each graph of the first set of graphs may be filtered to determine a first set of graph elements, based on the determined set of explain scores. Thereafter, a second dataset including a set of randomized graphs may be generated based on the first set of graphs. Further, the graph explainer model may be applied the generated second dataset to determine a set of noise scores. Further, the determined set of explain scores may be denoised to determine a set of denoised explain scores, based on the determined set of noise scores. Further, graph elements of each graph of the first set of graphs may be filtered to determine a second set of graph elements, based on the determined set of denoised explain scores. Further, a first set of feature vectors may be determined for the determined first set of graph elements. Further, a second set of feature vectors may be determined for the determined second set of graph elements. Further, a set of prediction driving graph elements associated with the first set of graphs may be determined based on the first set of feature vectors and the second set of feature vectors. Finally, graph data including explainability information associated with the first set of graphs may be rendered based on the determined set of prediction driving graph elements.

An explainable graph machine learning workflow may involve generation of a predictive model based on training graph data. The predictive model may be trained by a graph neural network based on the training graph data. The explainable graph machine learning workflow may further include generation of predictions by the predictive model based on an application of the predictive model on inference graph data, and generation of explanations for the predictions by an explainable graph machine learning model. The generated explanations may be indicative of graph elements (for example, node, edge, node-features, edge-features, graph properties, substructure, motif, or the like) that may be identified as prediction drivers. The explanations may be generated by an explainer model that may acquire information from the predictive model or modify the inference graph data or the predictive model (for the generation of the explanations). The explanations may ensure that the predictions are transparent, trustworthy, accurate, fair, and human interpretable. The explanations may further allow a user to comprehend or deduce the reasoning behind the predictions.

Typically, the explanations for the predictions may be generated as a post-hoc step, i.e., after the generation of the predictions. Further, traditionally, the explanation may be generated on a localized basis, i.e., an explanation may be generated for each prediction. Even though the explanations may facilitate in building of trust and confidence of users in the generated predictions, localized interpretation of the explanations may subject the explanations to confirmation bias. Further, the generation of the post-hoc explanations for the predictions may result in a large percentage of inconclusive explanations. For example, in some instances, graph elements (such as nodes or edges) may be incorrectly identified as those that are driving or influencing a prediction. However, in other instances, graph elements driving a prediction may be partially identified. In such instances, a subset of the graph elements of a set of graph elements driving the prediction may be identified and other prediction driving graph elements of the set of graph elements may be undetected (missed).

According to one or more embodiments of the present disclosure, the technological field of explainable graph machine learning may be improved by configuring a computing system (for example, an electronic device) in a manner that the computing system may be able to process information (for example, explanation scores) generated by an explainable graph machine learning model, for detection of noise in the obtained explanation scores. The processing may include a global statistical analysis of cumulative explanation scores that may be determined based on multiple applications of prediction or explanation models on input graph data (which may include a set of input graphs, such as, a production graph dataset). The cumulative explanation scores may signify a contribution of graph elements of each input graph to predictions on different input graph data characteristics. The determination of cumulative explanation scores may enable detection and isolation of noise in the explanation scores. Through the global statistical analysis, the computing system may identify graph elements (i.e., nodes, edges, or structure of the graph data) in each input graph of the set of input graphs, that may be the most pertinent drivers of the predictions.

The computing system may create a randomized graph dataset based on a modification of features of graph elements of graphs in the production graph dataset. For the modification, graph elements in the production graph dataset may be identified based on automatic machine learning. Automatic machine learning may improve an efficiency of the identification of features and graph elements that may introduce noise in the explanation scores. The identified graph elements may not drive predictions, and, hence, may be modified for creation of the randomized graph dataset. The creation of the randomized graph dataset may allow artificial creation of an explanation noise. The computing system may further use the identified graph elements to determine a baseline noise that may affect the cumulative explanation scores. The baseline noise may be removed from the cumulative explanation scores for the determination of denoised explanation scores.

The computing system may perform a clustered search based on the cumulative explanation scores and the denoised explanation scores to facilitate a global interpretation of explanation results for the predictions. The clustered search may include a determination of similarity between features of the graph elements (in the production graph dataset), which may be determined as prediction drivers based on the cumulative explanation scores and the denoised explanation scores. The clustered search may further include clustering the graph elements, determined as prediction drivers, into clusters based on the features of the graph elements. The clustered search may allow a determination of actual prediction driving graph elements in the production graph dataset based on features of the graph elements. The clustered search may further resolve conflicts between explanation results obtained based on the cumulative explanation scores and the denoised explanation scores, and also enhance a quality of explanations generated by the explainable graph machine learning model. The computing system may further facilitate an accurate visualization of explainability information corresponding to the actual graph elements determined based on the clustered search.

Embodiments of the present disclosure are explained with reference to the accompanying drawings.

FIG. 1 is a diagram representing an example network environment related to global interpretation of graph learning explainability based on cumulative denoising and clustered search, according to at least one embodiment described in the present disclosure. With reference to FIG. 1, there is shown a network environment 100. The network environment 100 may include an electronic device 102, a user-end device 104, and a server 106 (that may host a database 108). The electronic device 102 may include a graph explainer model 110 and a first dataset 114 (which may include a first set of graphs 114A . . . 114N). The electronic device 102, the user-end device 104, and the server 106 may be communicatively coupled to one another, via a communication network (such as the communication network 112).

The electronic device 102 may include suitable logic, circuitry, interfaces, and/or code that may be configured to receive the first dataset 114 including the first set of graphs 114A . . . 114N. The electronic device 102 may be further configured to generate a second dataset 116 including a set of randomized graphs based on the first set of graphs 114A . . . 114N. The electronic device 102 may apply the graph explainer model 110 on the received first dataset 114 to determine a set of explain scores, and may apply the graph explainer model 110 on the second dataset 116 to determine a set of noise scores. Further, the electronic device 102 may filter graph elements of each graph of the first set of graphs 114A . . . 114N to determine a first set of graph elements based on the determined set of explain scores. In addition, the electronic device 102 may denoise the determined set of explain scores based on the determined set of noise scores to determine a set of denoised explain scores. Further, the electronic device 102 may filter graph elements of each graph of the first set of graphs 114A . . . 114N to determine a second set of graph elements based on the determined set of denoised explain scores. Thereafter, the electronic device 102 may determine a first set of feature vectors for the first set of graph elements and a second set of feature vectors for the second set of graph elements. The electronic device 102 may be further configured to determine a set of prediction driving graph elements associated with each graph of the first set of graphs 114A . . . 114N, based on the first set of feature vectors and the second set of feature vectors. The electronic device 102 may be further configured to render graph data that may include explainability information associated with the first set of graphs 114A . . . 114N, based on the determined set of prediction driving graph elements. Examples of the electronic device 102 may include, but may not be limited to, a computing device, a smartphone, a mainframe machine, a server, a computer workstation, a consumer electronic (CE) device, and/or any device with a graph-processing capability (such as, a device with a set of graphic processor units (GPU)).

The user-end device 104 may include suitable logic, circuitry, interfaces, and/or code that may be configured to receive control instructions from the electronic device 102. The user-end device 104 may be configured to render, based on the received control instructions, an electronic user interface (UI) that comprises one or more UI elements corresponding to graph data including explainability information associated with a plurality of graphs. The user-end device 104 may be further configured to receive, via the electronic UI, a user input indicative of a user-selection of a first set of graphs (for example, the first set of graphs 114A . . . 114N) from a plurality of graphs. In FIG. 1, the electronic device 102 and the user-end device 104 are shown as two separate devices merely as an example. In some embodiments, the entire functionality of the user-end device 104 may be incorporated in the electronic device 102, without a deviation from the scope of the disclosure. Examples of the user-end device 104 may include, but are not limited to, a computing device, a tablet, a smartphone, a smart wearable device, a gaming console, a virtual reality (VR) device, an augmented reality (AR) device, a mixed reality (MR) device, a mainframe machine, a computer workstation, an internet of things (IoT) device, and/or any consumer electronic (CE) device.

The server 106 may include suitable logic, circuitry, and interfaces, and/or code that may be configured to receive requests from the electronic device 102 for the first dataset 114 (i.e., the first set of graphs 114A . . . 114N). The server 106 may be further configured to retrieve the first dataset 114 from the database 108 and transmit the first dataset 114 to the electronic device 102. In at least one embodiment, the server 106 may receive the first dataset 114 from the electronic device 102 and may generate the second dataset 116 (i.e., the set of randomized graphs) based on the received first dataset and transmit the second dataset 116 to the electronic device 102. In some embodiments, the server 106 may be configured to apply the graph explainer model 110 on the received first dataset 114 to determine the set of explain scores and transmit the set of explain scores to the electronic device 102. The server 106 may be configured to apply the graph explainer model 110 on the second dataset 116 to determine a set of noise scores and transmit the set of explain scores to the electronic device 102. The server 106 may be implemented as a cloud server and may execute operations through web applications, cloud applications, hypertext transport protocol (HTTP) requests, repository operations, file transfer, and the like. Other example implementations of the server 106 may include, but are not limited to, a database server, a file server, a web server, a media server, an application server, a mainframe server, a cloud computing server, and/or any device with a graph-processing capability (such as, a device with a set of graphic processor units (GPU)).

In at least one embodiment, the server 106 may be implemented as a plurality of distributed cloud-based resources by use of several technologies that may be well known to those ordinarily skilled in the art. A person with ordinary skill in the art will understand that the scope of the disclosure may not be limited to the implementation of the server 106 and the electronic device 102 as two separate entities. In certain embodiments, the functionalities of the server 106 can be incorporated in its entirety or at least partially in the electronic device 102, without a departure from the scope of the disclosure.

The database 108 may include suitable logic, circuitry, interfaces, and/or code that may be configured to store a first dataset 114 (i.e., the first set of graphs 114A . . . 114N) representative of various domains (such as, a social network-domain, a finance-domain dataset, a molecular chemistry-domain dataset, an ecommerce-domain, or a genome sequence-domain dataset). The database 108 may also store the second dataset 116. In an embodiment, the database 108 may be further configured to store the graph explainer model 110. The database 108 may be derived from data off a relational or non-relational database, or a set of comma-separated values (csv) files in a conventional storage or a big-data storage. In certain scenarios, the database 108 may correspond to a file system that may be mounted on a storage device. For example, the first dataset 114, the second dataset 116, and/or the graph explainer model 110 may be stored on the file system mounted on the storage device that may host the database 108. In an embodiment, the database 108 may be stored or cached on a device, such as, the server 106 or the electronic device 102. The device storing the database 108 may be configured to receive a query for the first dataset 114. In response, the device storing the database 108 may be configured to retrieve and transmit the first dataset 114 to the electronic device 102. In accordance with an embodiment, the database 108 may be hosted on a plurality of servers stored at same or different locations. The operations of the database 108 may be executed using hardware including a processor, a microprocessor (for example, to perform or control performance of one or more operations), a field-programmable gate array (FPGA), or an application-specific integrated circuit (ASIC). In some other instances, the database 108 may be implemented using software.

The graph explainer model 110 may include suitable logic, circuitry, interfaces, and/or code that may configured to analyze predictions on input graph data (such as the first dataset 114, the second dataset 116, or combinations of graph elements of the first dataset 114). The predictions on the input graph data may be analyzed to generate an output result (for example, an explain score) for each graph element of each graph of the first set of graphs 114A . . . 114N or the set of randomized graphs. The explain score for a graph element may be indicative of a degree of contribution of the graph element towards a prediction that may be generated by a graph neural network based on an input graph data. The graph explainer model 110 may be a trained graph neural network model that may recognize different types of nodes, or edges between each pair of nodes, in the input graph data. The edges may correspond to different connections or relationship between each node in the input graph data. Based on the recognized nodes and edges, the graph explainer model 110 may generate explanations that may be used to classify or predict the input graph data (e.g., using node classification tasks) into different labels or classes, and generate explanations that may be used to understand, explain, or provide reason(s) for the classification (i.e., prediction). In an example, a particular node of the input graph data may include a set of features associated therewith. Further, each edge may connect with different nodes having similar set of features. The electronic device 102 may be configured to encode the set of features to generate a feature vector using the graph explainer model 110. After the encoding, information may be passed between the particular node and the neighboring nodes connected through the edges. Based on the information passed to the neighboring nodes, a final vector may be generated for each node. Such final vector may include information associated with the set of features for the particular node as well as the neighboring nodes, thereby providing reliable and accurate information associated with the particular node. As a result, the graph explainer model 110 may analyze the information represented as the input graph data and provide reasons behind a certain prediction result on the input graph data. In an embodiment, the graph explainer model 110 may be stored in the electronic device 102, the server 106, or the database 108. The graph explainer model 110 may be implemented using hardware including a processor, a microprocessor (e.g., to perform or control performance of one or more operations), a field-programmable gate array (FPGA), or an application-specific integrated circuit (ASIC). In some other instances, the graph explainer model 110 may be a code, a program, or set of software instruction and may be implemented using a combination of hardware and software.

In some embodiments, the graph explainer model 110 may correspond to a machine learning model (e.g., a neural network model) with multiple classification layers for classification of different nodes in the input graph data, where each successive layer may use an output of a previous layer as input. Each classification layer may be associated with a plurality of edges, each of which may be further associated with plurality of weights. During training, the graph explainer model 110 may be configured to filter or remove the edges or the nodes based on the input graph data and further provide an output result (i.e., a graph representation). Examples of the graph explainer model 110 may include, but are not limited to, a graph convolution network (GCN), a Graph Spatial-Temporal Networks with GCN, a recurrent neural network (RNN), a deep Bayesian neural network, and/or a combination of such networks.

The communication network 112 may include a communication medium via which the electronic device 102, the server 106, and the database 108 may communicate with each other. The communication network 112 may be one of a wired connection or a wireless connection. Examples of the communication network 112 may include, but are not limited to, the Internet, a cloud network, a Cellular or Wireless Mobile Network (such as, Long-Term Evolution and 5G New Radio), a satellite network (such as, a network of a set of low-earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 112 in accordance with various wired and wireless communication protocols. Examples of the wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may be configured to receive a first dataset 114 that may include a first set of graphs 114A . . . 114N. Each graph of the first set of graphs 114A . . . 114N in the first dataset 114 may be representative of a domain dataset (for example, a genome sequence-domain dataset, an ecommerce-domain dataset, or a social network-domain dataset). In some embodiments, the first dataset 114 may be received from the server 106 or the database 108 (via the server 106). Each graph of the first set of graphs 114A . . . 114N may include graph elements (for example, node features, edges features, or graph structures). Each node feature of a graph may be representative of an entity associated with the domain and each edge between any two nodes of the set of nodes may be indicative of a relationship between two entities represented by the two nodes. For example, the first dataset 114 may include genetic expression data and each graph of the first set of graphs 114A . . . 114N may be representative of genome sequence-domain. The first set of graphs 114A . . . 114N may include genetic expression data that may be obtained based on wet laboratory experiments. The graph elements of each graph of the first set of graphs 114A . . . 114N may be representative of genes (nodes) and relationships or correlations (edges) between the genes. Details of reception of the first dataset 114 are further provided, for example, in FIG. 3.

The electronic device 102 may be further configured to apply the graph explainer model 110 on the received first dataset 114 to determine a set of explain scores. The graph explainer model 110 may be applied on the first dataset 114 for determination of graph elements of each graph of the first set of graphs 114A . . . 114N that may be driving predictions generated by a graph neural network. The electronic device 102 may compute explain scores associated with the graph elements of each graph based on the application of the graph explainer model 110 on the generated predictions to determine the prediction-driving graph elements.

In accordance with an embodiment, the electronic device 102 may include an explainable graph artificial intelligence (GXAI) module. The GXAI module may include the graph explainer model 110 and the graph neural network (i.e., a predictive model). The predictive model may be trained to perform node-level, edge-level, and graph-level prediction tasks. The predictive model may generate a prediction on a graph and the graph explainer model 110 may determine a contribution of each graph element of the graph to the prediction. The predictive model may be applied on each graph (i.e., input graph data) of the first set of graphs 114A . . . 114N multiple times for generation of a subset of predictions of a set of predictions. For example, the predictive model may be applied on the graph 114A multiple times for generation of a first subset of predictions of the set of predictions. At each instance of application of the predictive model on the graph 114A, a prediction of the first subset of predictions may be generated for the graph 114A. Further, the graph explainer model 110 may be applied on each prediction of the first subset of predictions. Based on the applications, a first subset of explain scores of the set of explain scores for the graph 114A may be determined. The application of each prediction of the first subset of predictions may lead to determination of a subset of initial explain scores. Thus, multiple subsets of initial explain scores may be determined based on applications of the graph explainer model 110 on the first subset of predictions. The first subset of explain scores may be determined based on an element-wise accumulation of initial explain scores in each set of initial explain scores.

The first subset of explain scores may be associated with graph elements of the graph 114A. Each explain score of the first subset of explain scores may be indicative of a contribution of a graph element of the graph 114A to the first subset of predictions on the graph 114A. A higher explain score associated with a graph element of the graph 114A may indicate a greater contribution of the graph element to the first subset of predictions on the graph 114A. However, a lower explain score associated with a graph element of the graph 114A may indicate a lower contribution of the graph element to the first subset of predictions on the graph 114A.

Similarly, other subsets of explain scores of the set of explain scores associated with graph elements of other graphs of the first set of graphs 114A . . . 114N may be determined. Such subsets of explain scores may be indicative of contributions of the graph elements of other graphs towards other subsets of predictions. Details of application of the graph explainer model 110 for determination of the set of explain scores are further provided, for example, in FIG. 3 and FIG. 4.

The electronic device 102 may be further configured to filter graph elements of each graph of the first set of graphs 114A . . . 114N to determine a first set of graph elements based on the determined set of explain scores. The electronic device 102 may determine (based on explain scores (of the set of explain scores) associated with graph elements of each graph) contributions of the graph elements to a prediction on the corresponding graph. Based on the contributions, graph elements that do not drive the prediction may be determined, and, subsequently, filtered or removed from the corresponding graph. In accordance with an embodiment, the electronic device 102 may apply the predictive model on each graph of the first set of graphs 114A . . . 114N multiple times for generation of multiple predictions for same input graph data. The contribution of each graph element of each graph (for example, the graph 114A) of the first set of graphs 114A . . . 114N to each prediction on the graph 114A, generated at each instance of application of the predictive model on the graph 114A, may be different.

For example, the electronic device 102 may apply the predictive model on the graph 114A four times for generation of four predictions. The contribution of each graph element to each of the four predictions may be different. The contribution may be determined based on an application of the graph explainer model 110 on each of the four predictions. Thus, multiple explain scores (for example, four explain scores) indicative of the contributions of each graph element to multiple predictions (for example, four predictions) on each graph of the first set of graphs 114A . . . 114N may be obtained. The multiple explain scores associated with each graph element of each graph of the first set of graphs 114A . . . 114N may be normalized and accumulated to determine a final explain score for each graph element. Based on the final explain score, the electronic device 102 may, subsequently, filter the corresponding graph element from the corresponding graph. The unfiltered graph elements (or the graph elements left after the filtering) of the corresponding graph may be determined as a subset of graph elements of the first set of graph elements (for the corresponding graph). Details of filtering of the first set of graphs 114A . . . 114N are further provided, for example, in FIG. 3 and FIG. 4.

The electronic device 102 may be further configured to generate a second dataset 116 including the set of randomized graphs based on the first set of graphs 114A . . . 114N. Each randomized graph of the set of randomized graphs may correspond to a graph of the first set of graphs 114A . . . 114N and may be obtained based on a modification or randomization of features of graph elements belonging to the graph. In accordance with an embodiment, the electronic device 102 may identify a set of combinations of graph elements that belong to each graph of the first set of graphs 114A . . . 114N. The identification may be based on principle component analysis and similarity analysis of each of the graph elements. The graph elements in each identified combination of the set of combinations may be obtained from a set of graph elements belonging to a corresponding graph. The electronic device 102 may select the set of graph elements belonging to each graph of the first set of graphs 114A . . . 114N using auto machine learning. Thus, the graph elements in each identified combination of the set of combinations may be obtained from the selected set of graph elements.

For example, the electronic device 102 may identify five combinations of graph elements that belong to the graph 114A. The graph elements in each of the five combinations may be identified from a set of graph elements that may be selected from the graph 114A based on auto machine learning (or AutoML). For each combination of the five combinations, the electronic device 102 may be configured to determine a randomized graph of the set of randomized graphs. The electronic device 102 may select a first combination of graph elements belonging to the graph 114A and randomize features of each graph element of the first combination for the generation of a randomized graph corresponding to the graph 114A. Similarly, four additional randomized graphs that correspond to the graph 114A may be generated. Further, randomized graphs corresponding to each of the other graphs of the first set of graphs 114A . . . 114N may be generated. Details of generation of the set of randomized graphs are further provided, for example, in FIG. 3, FIG. 5A, and FIG. 5B.

The electronic device 102 may be further configured to apply the graph explainer model 110 on the generated second dataset 116 to determine a set of noise scores. The electronic device 102 may apply the predictive model on each randomized graph (of the second dataset 116) corresponding to each graph of the first set of graphs 114A . . . 114N. Based on the application of the predictive model, a prediction may be generated on each randomized graph. The electronic device 102 may further apply the graph explainer model 110 on the prediction to determine explain scores associated with graph elements of a corresponding randomized graph. Thus, explain scores for each randomized graph of the second dataset 116 may be determined. Thereafter, the electronic device 102 may determine randomized graphs with graph elements associated with explain scores that have an even distribution. The electronic device 102 may determine at least one randomized graph corresponding to each graph of the first set of graphs 114A . . . 114N that may include graph elements associated with explain scores having an even distribution.

In accordance with an embodiment, the electronic device 102 may determine a combination of graph elements, whose features were randomized for generation of a randomized graph (that includes graph elements associated with explain scores with an even distribution) that corresponds to a graph of the first set of graphs 114A . . . 114N. In case, multiple randomized graphs (that include graph elements associated with explain scores with an even distribution) corresponding to a particular graph (for example, the graph 114A) of the first set of graphs 114A . . . 114N are generated, a randomized graph may be selected amongst the multiple randomized graphs. A combination of graph elements, whose features were modified for generation of the selected randomized graph, may be longest amongst combinations of graph elements whose features were modified for generation of the other determined randomized graphs that correspond to the graph 114A. Thus, a combination of graph elements may be determined for each graph of the first set of graphs 114A . . . 114N, which may be used for generation of a subset of noise scores of the set of noise scores.

In accordance with an embodiment, the electronic device 102 may apply the predictive model on the graph elements of the determined combination for each graph of the first set of graphs 114A . . . 114N. For example, the predictive model may be applied on graph elements of a combination, determined for the graph 114A, for generation of a prediction. Thereafter, the graph explainer model 110 may be applied on the prediction for determination of explain scores. The determined explain scores may correspond to a first subset of noise scores of the set of noise scores for the graph 114A. Similarly, other subsets of noise scores for the other graphs of the first set of graphs 114A . . . 114N may be determined for the determination of the set of noise scores. Each subset of noise scores for a graph of the first set of graphs 114A . . . 114N may be representative of a baseline explain noise that may be required to be eliminated to obtain accurate explain scores indicative of actual contributions of graph elements of the graph to a prediction on the graph. Details of determination of the set of noise scores are further provided, for example, in FIG. 3, FIG. 5A, FIG. 5B, and FIG. 6.

The electronic device 102 may be further configured to denoise the determined set of explain scores to determine a set of denoised explain scores, based on the determined set of noise scores. In accordance with an embodiment, the electronic device 102 may denoise a subset of explain scores of the set of explain scores for each graph of the first set of graphs 114A . . . 114N based on a subset of noise scores of the set of noise scores for the corresponding graph. For example, the first subset of explain scores for the graph 114A (i.e., explain scores associated with graph elements of the graph 114A) may be denoised based on the first subset of noise scores for the graph 114A. The electronic device 102 may compute a graph element-wise subtraction of noise scores of the first subset of noise scores from explain scores of the first subset of explain scores. Based on the subtraction, a first subset of denoised explain scores (of the set of denoised explain scores) for the graph 114A may be determined. Each denoised explain score of the first subset of denoised explain scores may be associated with each graph element of the graph 114A. Similarly, other subsets of denoised explain scores (of the set of denoised explain scores) for other graphs of the first set of graphs 114A . . . 114N may be determined. Details of denoising of the set of explain scores are further provided, for example, in FIG. 3 and FIG. 6.

The electronic device 102 may be further configured to filter graph elements of each graph of the first set of graphs 114A . . . 114N to determine a second set of graph elements, based on the determined set of denoised explain scores. Each subset of denoised explain scores of the set of denoised explain scores, determined for each graph of the first set of graphs 114A . . . 114N, may be indicative of contributions of graph elements of a corresponding graph to predictions on the corresponding graph. Based on the contributions, the electronic device 102 may determine graph elements that may not drive the prediction on the corresponding graph, and, subsequently, filter those graph elements. For example, based on the first subset of denoised explain scores associated with each graph element of the graph 114A, the graph elements that may not drive the prediction on the graph 114A may be determined and filtered. The unfiltered graph elements (or graph elements that remain after the filtering) of the graph 114A may be determined as a first subset of graph elements of the second set of graph elements. Similarly, other subsets of graph elements of the second set of graph elements may be determined based on subsets of denoised explain scores associated with the graph elements of the other graphs of the first set of graphs 114A . . . 114N. Details of determination of the second set of graph elements are further provided, for example, in FIG. 3, FIG. 5A, and FIG. 5B.

The electronic device 102 may be further configured to determine a first set of feature vectors for the first set of graph elements. Each feature vector of the first set of feature vectors may correspond to a graph element of the first set of graph elements. The first set of feature vectors may correspond to prediction driving graph elements of the first set of graphs 114A . . . 114N determined based on the explain scores that may be associated with each graph element of the first set of graph elements.

The electronic device 102 may be further configured to determine a second set of feature vectors for the second set of graph elements. Each feature vector of the second set of feature vectors may correspond to a graph element of the second set of graph elements. The second set of feature vectors may correspond to prediction driving graph elements of the first set of graphs 114A . . . 114N determined based on denoised explain scores that may be associated with each graph element of the second set of graph elements. Details of determination of the first set of feature vectors and the second set of feature vectors are further provided, for example, in FIG. 3 and FIG. 7.

The electronic device 102 may be further configured to determine a set of prediction driving graph elements associated with the first set of graphs 114A . . . 114N, based on the first set of feature vectors and the second set of feature vectors. In accordance with an embodiment, the electronic device 102 may determine a similarity between each pair of feature vectors belonging to the first set of feature vectors, the second set of feature vectors, or the first set of feature vectors and the second set of feature vectors. The determination of the similarity between each pair of feature vectors may be based on unsupervised learning. The determined similarity may correspond to a similarity of distribution of feature values of the feature vectors in each pair of feature vectors. Based on the determined similarity, the electronic device 102 may group feature vectors of the first set of feature vectors and feature vectors of the second set of feature vectors into a plurality of clusters for the clustered search. In accordance with an embodiment, the electronic device 102 may determine graph elements of each graph of the first set of graphs 114A . . . 114N, whose feature vectors are grouped into different cluster of the plurality of clusters, as prediction driving graph elements. Details of determination of the set of prediction driving graph elements are further provided, for example, in FIG. 3 and FIG. 7.

The electronic device 102 may be further configured to render graph data that may include explainability information associated with the first set of graphs 114A . . . 114N, based on the determined set of prediction driving elements. In accordance with an embodiment, the rendered explainability information may include the determined set of prediction driving graph elements, explain scores associated with each prediction driving graph element of the set of prediction driving graph elements, or graphs of the first set of graphs 114A . . . 114N where graph elements of the graphs determined as prediction driving graph elements are annotated. In some embodiments, the electronic device 102 may control the user-end device 104 to render the graph data that may include explainability information. Details of rendering of the explainability information associated with the first set of graphs 114A . . . 114N are further provided, for example, in FIG. 3 and FIG. 8, FIG. 9, FIG. 10A, FIG. 10B, FIG. 11A, FIG. 11B, and FIG. 12.

Modifications, additions, or omissions may be made to FIG. 1 without departing from the scope of the disclosure. For example, the network environment 100 may include more or fewer elements than those illustrated and described in the present disclosure. In some embodiments, the functionality of each of the user-end device 104, the server 106, and the database 108, may be incorporated into the electronic device 102, without a deviation from the scope of the disclosure.

FIG. 2 is a block diagram that illustrates an exemplary electronic device for global interpretation of graph learning explainability based on cumulative denoising and clustered search, in accordance with at least one embodiment described in the present disclosure. FIG. 2 is explained in conjunction with elements from FIG. 1. With reference to FIG. 2, there is shown a block diagram 200 of a system 202 that includes the electronic device 102. The electronic device 102 may include a processor 204, a memory 206, a persistent data storage 208, an input/output (I/O) device 210, and a network interface 212. In at least one embodiment, the memory 206 may store the graph explainer model 110. In at least one embodiment, the I/O device 210 may include a display device 210A.

The processor 204 may include suitable logic, circuitry, and interfaces that may be configured to execute a set of instructions stored in the memory 206. The processor 204 may be configured to execute program instructions associated with different operations to be executed by the electronic device 102. The processor 204 may be configured to receive a first dataset 114 including a first set of graphs 114A . . . 114N. The processor 204 may be further configured to apply the graph explainer model 110 on the received first dataset 114 to determine a set of explain scores. The processor 204 may be further configured to filter graph elements of each graph of the first set of graphs 114A . . . 114N to determine a first set of graph elements, based on the determined set of explain scores. The processor 204 may be further configured to generate a second dataset 116 including a set of randomized graphs. The processor 204 may be further configured to apply the graph explainer model 110 on the received second dataset 116 to determine a set of noise scores. The processor 204 may be further configured to denoise the determined set of explain scores to determine a set of denoised explain scores, based on the determined set of noise scores. The processor 204 may be further configured to filter graph elements of each graph of the first set of graphs 114A . . . 114N to determine a second set of graph elements based on the determined set of denoised explain scores. The processor 204 may be further configured to determine a first set of feature vectors for the determined first set of graph elements. The processor 204 may be further configured to determine a second set of feature vectors for the determined second set of graph elements. The processor 204 may be further configured to determine a set of prediction driving graph elements associated with the first set of graphs 114A . . . 114N based on the first set of feature vectors and the second set of feature vectors. The processor 204 may be further configured to render graph data including explainability information associated with the first set of graphs 114A . . . 114N, based on the determined set of prediction driving elements. The processor 204 may be implemented based on a number of processor technologies known in the art. Examples of the processor technologies may include, but are not limited to, a Central Processing Unit (CPU), X86- based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In at least one embodiment, the processor 204 may be configured to interpret and/or execute program instructions, or process data that may be stored in the memory 206 or the persistent data storage 208. In some embodiments, the processor 204 be configured to may fetch program instructions from the persistent data storage 208 and load the program instructions in the memory 206. After the program instructions are loaded into the memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 that may store the received first dataset 114, the generated second dataset 116, the set of randomized graphs, the first set of graph elements of the first set of graphs 114A . . . 114N, the second set of graph elements of the first set of graphs 114A . . . 114N, the first set of feature vectors, the second set of feature vectors, the set of prediction driving graph elements, and the explainability information associated with the first set of graphs 114A . . . 114N. The memory 206 may further store the graph explainer model 110. Examples of implementation of the memory 206 may include, but are not limited to, a CPU cache, a Hard Disk Drive (HDD), a Solid-State Drive (SSD), Random Access Memory (RAM), Read Only Memory (ROM), Electrically Erasable Programmable Read-Only Memory (EEPROM), and/or a Secure Digital (SD) card.

The persistent data storage 208 may include suitable logic, circuitry, and/or interfaces that may be configured to store program instructions executable by the processor 204. The persistent data storage 208 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The I/O device 210 may include suitable logic, circuitry, and interfaces that may be configured to receive inputs and render outputs based on the received inputs. For example, the I/O device 210 may receive an input that may trigger reception of the first dataset 114. The I/O device 210 may further receive a first user input indicative of a user-selection of the first set of graphs 114A . . . 114N from a plurality of graphs included in the first dataset 114. Further, the I/O device 210 may render outputs, such as, the set of prediction driving graph elements associated with the first set of graphs 114A . . . 114N, each set of reduced sub-graphs (such as the set of reduced sub-graphs-1 118A), or explainability information associated with the first set of graphs 114A . . . 114N. The I/O device 210 which may include various input and output devices, may be configured to communicate with the processor 204. Examples of the I/O device 210 may include, but are not limited to, a touch screen, a keyboard, a mouse, a joystick, a display device (e.g., the display device 210A), a microphone, and a speaker.

The display device 210A may include suitable logic, circuitry, and interfaces that may be configured to render graph data that may include explainability information associated with the first set of graphs 114A . . . 114N set of graphs, determined by the electronic device 102 based on the determined set of prediction driving elements. The graph data may be rendered on the display device 210A, via an electronic user interface (UI). The display device 210A may be a touch screen which may enable a user to provide a user-input via the display device 210A. The touch screen may be at least one of a resistive touch screen, a capacitive touch screen, or a thermal touch screen. The display device 210A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210A may refer to a display screen of a head mounted device (HMD), a smart-glass device, a see-through display, a projection-based display, an electro-chromic display, or a transparent display.

The network interface 212 may include suitable logic, circuitry, and interfaces that may be configured to facilitate communication between the processor 204 (i.e., the electronic device 102) and the server 106, via the communication network 112. The network interface 212 may be implemented by use of various known technologies to support wired or wireless communication of the electronic device 102 with the communication network 112. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Enhanced Data GSM Environment (EDGE), wideband code division multiple access (W-CDMA), Long Term Evolution (LTE), 5th Generation (5G) New Radio (NR), Global System for Mobile Communications (GSM), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
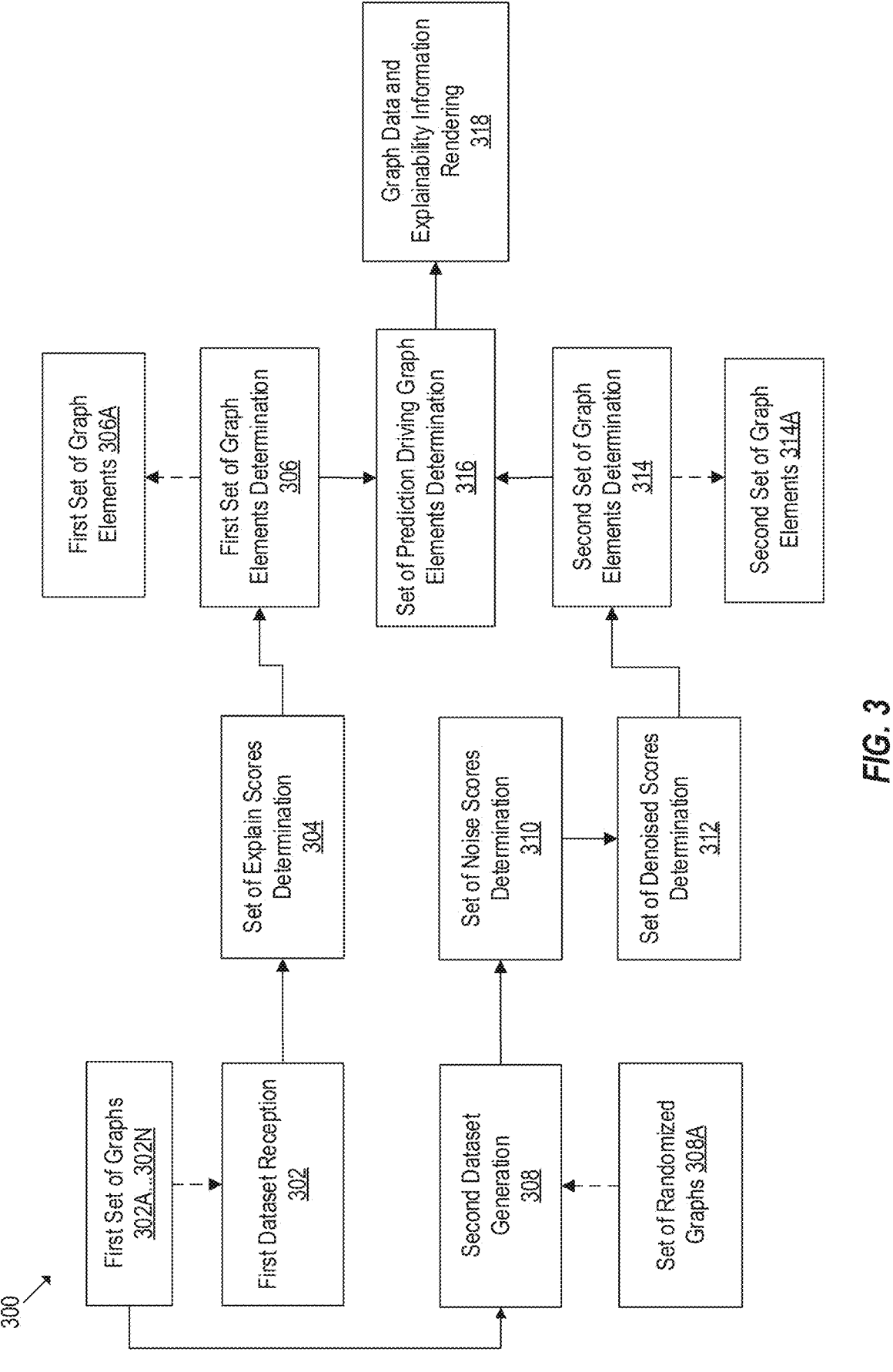
FIG. 3 is a diagram that illustrates an exemplary execution pipeline for global interpretation of graph learning explainability based on cumulative denoising and clustered search.

FIG. 3 is a diagram that illustrates an exemplary execution pipeline for global interpretation of graph learning explainability based on cumulative denoising and clustered search, in accordance with an embodiment of the disclosure. FIG. 3 is described in conjunction with elements from FIG. 1, and FIG. 2. With reference to FIG. 3, there is shown an execution pipeline 300. The exemplary execution pipeline 300 may include a sequence of operations that may be executed by the processor 204 of the electronic device 102 of FIG. 1 for global interpretation of graph learning explainability based on cumulative denoising and clustered search. In the execution pipeline 300, there is shown a sequence of operations that may start from 302 and end at 318.

At 302, a first dataset may be received. In at least one embodiment, the processor 204 may be configured to receive the first dataset that may include a first set of graphs 302A . . . 302N. The first dataset (i.e., the first set of graphs 302A . . . 302N) may be received as input graph data (or production graph data) that may be representative of a domain dataset. Each graph of the first set of graphs 302A . . . 302N may include graph elements such as nodes, edges, or graph structures. Further, each graph element may be associated with a feature vector.

For example, the first dataset may correspond to a finance-domain dataset, an ecommerce-domain dataset, a social network-domain dataset, a molecular chemistry-domain dataset, or a genome sequence-domain dataset. If the graphs of the first set of graphs 302A . . . 302N correspond to the molecular chemistry-domain dataset, the graphs of the first set of graphs 302A . . . 302N may represent chemical molecules, nodes of the graphs may represent atoms of the chemical molecules, and each edge between a pair of nodes (i.e., atoms) may represent a chemical bond (or nature of chemical bond between the pair of atoms.

At 304, a set of explain scores may be determined. In at least one embodiment, the processor 204 may be configured to determine the set of explain scores based on an application of the graph explainer model 110 on the first dataset 114 (i.e., the first set of graphs 302A . . . 302N). The processor 204 may be configured to apply the predictive model on each graph of the first set of graphs 302A . . . 302N for a predefined number of times to generate a subset of predictions on a corresponding graph. Thus, a set of predictions corresponding to the first set of graphs 302A . . . 302N may be generated. Thereafter, the processor 204 may be configured to apply the graph explainer model 110 on each subset of predictions, generated on each graph of the first set of graphs 302A . . . 302N, to determine a subset of explain scores of the set of explain scores associated with graph elements of the corresponding graph of the first set of graphs 302A . . . 302N. For example, a first subset of explain scores may be determined based on an application of the graph explainer model 110 on a first subset of predictions of the set of predictions generated on a first graph (for example, the graph 302A). Similarly, an $N^{th}$ subset of explain scores may be determined based on an application of the graph explainer model 110 on an $N^{th}$ subset of predictions of the set of predictions that may be generated on an $N^{th}$ graph (for example, the graph 302N).

A count of explain scores in each subset of explain scores corresponding to each graph of the first set of graphs 302A . . . 302N may be equal to a count of graph elements in a corresponding graph. For example, the first graph 302A may include 19 graph elements. For each graph element of the 19 graph elements, an explain score of the first subset of explain scores may be determined based on the application of the graph explainer model 110 on the first subset of predictions. Therefore, the first subset of explain scores may include 19 explain scores. Thus, each graph element of each graph of the first set of graphs 302A . . . 302N may be associated with an explain score of the set of explain scores. Further, an explain score of the set of explain score associated with a graph element may be indicative of a contribution of the graph element to predictions on a graph of the first set of graphs 302A . . . 302N to which the graph element may belong.

At 306, a first set of graph elements 306A may be determined based on the determined set of explain scores. In at least one embodiment, the processor 204 may be configured to determine the first set of graph elements 306A based on the determined set of explain scores. The determination of the first set of graph elements 306A may be based on filtering of graph elements of each graph of the first set of graphs 302A . . . 302N. The processor 204 may filter the graph elements of each graph of the first set of graphs 302A . . . 302N based on explain scores (of the set of explain scores) associated with the graph elements of the corresponding graph. The unfiltered graph elements (i.e., graph elements that remain after the filtering) of each graph of the first set of graphs 302A . . . 302N may constitute the first set of graph elements 306A and determined as prediction driving graph elements.

In accordance with an embodiment, the processor 204 may apply the predictive model on each graph of the first set of graphs 302A . . . 302N multiple times for generation of multiple predictions on the corresponding graph. For example, the processor 204 may apply the predictive model on the first graph 302A four times for generation of four predictions. Thereafter, the processor 204 may apply the graph explainer model 110 on each of the four predictions for determination of four subsets of initial explain scores for the first graph 302A. In case, the first graph 302A includes 19 graph elements, each of the four subsets of initial explain scores may include 19 initial explain scores that may be associated with the 19 graph elements of the first graph 302A. The four predictions may be generated and the four subsets of initial explain scores (corresponding to the four predictions) may be determined to overcome noise that may corrupt explain scores associated with graph elements during each application of the predictive model and the graph explainer model 110. The noise may lead to an incorrect identification of graph elements (of the first graph 302A) as prediction driving graph elements or a partial identification of graph elements (of the first graph 302A) that are driving the predictions. The processor 204 may normalize the initial explain scores associated with the graph elements of each of the four subsets of initial explain scores. Thereafter, the processor 204 may perform an accumulation of the normalized explain scores associated with each graph element in the four subsets of initial explain scores for determination of the first subset of explain scores of the set of explain scores.

Thus, multiple subsets of initial explain scores corresponding to the multiple predictions, generated on each graph of the first set of graphs 302A . . . 302N, may be determined. The initial explain scores in each of the multiple subsets of initial explain scores may be normalized. Thereafter, the processor 204 may perform an accumulation of normalized initial explain scores associated with each graph element of a corresponding graph in the multiple subsets of initial explain scores, for determination of each subset of explain scores.

The processor 204 may further sort explain scores of each subset of explain scores in an ascending order and determine a slope associated with the corresponding subset of sorted explain scores. For example, explain scores of the first subset of explain scores may be sorted and a slope associated with the first subset of sorted explain scores may be determined. The processor 204 may further identify an inflection point associated with the sorted first subset of explain scores for which the determined slope is beyond a positive threshold slope. The processor 204 may further determine graph elements associated with explain scores of the first subset of explain scores that are beyond the identified inflection point. The determined graph elements of the first graph 302A may form a first subset of graph elements of the first set of graph elements 306A corresponding to the first graph 302A. The graph elements of the first graph 302A associated with explain scores that are not beyond the inflection point may be filtered. The graph elements of the first subset of graph elements may be determined as contributors of predictions on the first graph 302A or prediction driving graph elements for the first graph 302A. Similarly, the processor 204 may determine a subset of graph elements of the first set of graph elements 306A corresponding to each of the other graphs (such as the $N^{th}$ graph 302N) of the first set of graphs 302A . . . 302N for determination of the first set of graph elements 306A.

At 308, a second dataset including a set of randomized graphs may be generated based on the first set of graphs 302A . . . 302N. In at least one embodiment, the processor 204 may be configured to generate the second dataset that may include a set of randomized graphs 308A, based on the first set of graphs 302A . . . 302N. For generation of the set of randomized graphs, the processor 204 may initially select a set of graph elements from each graph of the first set of graphs 302A . . . 302N using automatic machine learning (Auto ML). In accordance with an embodiment, the processor 204 may be configured to perform a principal component analysis (PCA) and a similarity analysis on each graph element in each set of graph elements, selected from each graph of the first set of graphs 302A . . . 302N. The principal component analysis may be performed for identification of important graph elements in each set of graph elements selected from each graph (for example, the first graph 302A). The similarity analysis may be performed for identification of unimportant graph elements in each set of graph elements selected from each graph.

Thereafter, the processor 204 may identify combinations of graph elements from the set of graph elements selected from each graph of the first set of graphs 302A . . . 302N. For each graph (for example, the first graph 302A), a set of combinations of graph elements may be identified. For example, five combinations of graph elements may be identified for the first graph 302A, (i.e., a set of combinations identified for the first graph 302A may include five combinations). The graph elements in each of the five combinations may be obtained from the set of graph elements selected from the first graph 302A using Auto ML.

In accordance with an embodiment, the processor 204 may further store each combination, identified for each graph of the first set of graphs 302A . . . 302N, in a decision tree. Thereafter, the processor 204 may sort the combinations in a decision tree based on an importance and a dependency of each graph element (determined based on the principal component analysis and the similarity analysis) in each combination. The processor 204 may further select each combination that may be identified for each graph of the first set of graphs 302A . . . 302N. For example, a first combination for the first graph 302A may be selected. Thereafter, feature values of graph elements of the first graph 302A included in the first combination may be randomized for generation of a randomized graph corresponding to the graph 302A. Similarly, other randomized graphs, corresponding to the graph 302A, may be generated based on randomization of feature values of graph elements included in the other combinations identified for the first graph 302A. The generated randomized graphs corresponding to the graph 302A may constitute a first subset of randomized graphs of the set of randomized graphs 308A. Similarly, randomized graphs corresponding to each of the other graphs of the first set of graphs 302A . . . 302N may be generated. The randomized graphs may constitute other subsets of randomized graphs of the set of randomized graphs 308A.

At 310, a set of noise scores may be determined. In at least one embodiment, the processor 204 may be configured to determine the set of noise scores based on an application of the graph explainer model 110 on the second dataset 116 (i.e., the set of randomized graphs 308A). The processor 204 may apply the predictive model on each randomized graph of the set of randomized graphs 308A for generation of a prediction of a set of predictions. Thereafter, the processor 204 may apply the graph explainer model 110 on each prediction of the set of predictions. Based on the application of the graph explainer model 110 on each prediction of the set of predictions, a set of explain scores may be determined. Thereafter, the processor 204 may determine whether a distribution of the set of explain scores is even.

For example, a set of explain scores may be determined based on an application of the graph explainer model 110 on a prediction, which may be generated based on application of the predictive model on a randomized graph (of the first subset of randomized graphs) corresponding to the first graph 302A. If the distribution of the set of explain scores is determined to be even, the processor 204 may determine a combination, identified for the first graph 302A, including graph elements of the first graph 302A that may not be driving predictions on the first graph 302A. The determined combination may include graph elements of the first graph 302A that were randomized for the generation of the randomized graph corresponding to the first graph 302A.

The processor 204 may, similarly, determine other combinations of the set of combinations, identified for the first graph 302A, which may include graph elements of the first graph 302A whose features were randomized for generation of the other randomized graphs corresponding to the first graph 302A. Such combinations may be identified for the first graph 302A in case sets of explain scores associated with graph elements of the randomized graphs, corresponding to the first graph 302A, are determined to be evenly distributed. Amongst the determined combinations, the processor 204 may select the longest combination. The selected longest combination for the first graph 302A may be determined as a first combination for the first graph 302A. The first combination may be used for determination of a first subset of noise scores associated with the first graph 302A. On the contrary, if the distribution of a set of explain scores associated with graph elements of a randomized graph corresponding to the first graph 302A is odd, then a corresponding combination, identified for the first graph 302A (and including graph elements whose features were randomized to generate the randomized graph), may be deleted from the decision tree.

Similarly, a combination may be determined for each of the other graphs of the first set of graphs 302A . . . 302N for determination each subset of noise scores of the set of noise scores. For example, an $N^{th}$ combination may be determined for the $N^{th}$ graph 302N such that the $N^{th}$ combination may include graph elements of the $N^{th}$ graph 302N that may not be driving predictions on the $N^{th}$ graph 302N.

The processor 204 may be further configured to apply the predictive model on graph elements in each determined combination, identified for each graph of the first set of graphs 302A . . . 302N, to generate a set of predictions. Thereafter, the processor 204 may apply the graph explainer model 110 on each prediction of the set of predictions for generation of each subset of noise scores of the set of noise scores. For example, based on an application of the predictive model on graph elements of the first combination, determined for the first graph 302A, a first prediction may be generated. The graph explainer model 110 may be applied on the first prediction for determination of the first subset of noise scores for the first graph 302A. Similarly, an $N^{th}$ subset of noise scores of the set of noise scores associated with graph elements in an $N^{th}$ combination (determined for the $N^{th}$ graph 302N) may be determined for the $N^{th}$ graph 302N. The determination of the $N^{th}$ subset of noise scores may be based on an application of the graph explainer model 110 on an $N^{th}$ prediction on the graph elements in the $N^{th}$ combination.

At 312, a set of denoised explain scores may be determined based on the set of noise scores. In at least one embodiment, the processor 204 may be configured to determine the set of denoised explain scores based on the set of noise scores. The processor 204 may compute a graph element-wise subtraction of noise scores of each subset of noise scores for each graph of the first set of graphs 302A . . . 302N, from explain scores of each subset of explain scores of the set of explain scores associated with graph elements of the corresponding graph. Based on such subtraction, a subset of denoised explain scores of the set of denoised explain scores for the corresponding graph may be determined. For example, a first subset of denoised explain scores (for the first graph 302A) may be determined based on a graph element-wise subtraction of noise scores of the first subset of noise scores (for the first graph 302A) from explain scores of the first subset of explain scores (associated with graph elements of the first graph 302A). Similarly, an $N^{th}$ subset of denoised explain scores for the $N^{th}$ graph 302N may be determined based on the $N^{th}$ subset of noise scores for the $N^{th}$ graph 302N and the $N^{th}$ subset of explain scores associated with graph elements of the $N^{th}$ graph 302N.

In some embodiments, the processor 204 may normalize and compute an average of denoised explain scores of each subset of denoised explain scores associated with graph elements of a graph of the first set of graphs 302A . . . 302N.

At 314, a second set of graph elements 314A may be determined based on the determined set of denoised scores. In at least one embodiment, the processor 204 may be configured to determine the second set of graph elements 314A based on the determined set of denoised scores. The determination may be based on filtering of graph elements of each graph of the first set of graphs 302A . . . 302N based on a subset of denoised explain scores for the corresponding graph. The denoised explain scores in each subset of denoised explain scores for a graph may indicate a contribution of graph elements of the graph to predictions on the graph. A higher denoised explain score associated with a graph element may indicate a greater contribution and cause the graph element to be determined as a prediction driving graph element for the corresponding graph. On the other hand, a lower higher denoised explain score associated with a graph element may indicate a lower contribution and cause the graph element to be determined as a graph element that may not be driving predictions on the corresponding graph.

The processor 204 may be configured to filter graph elements, from each graph, that may not be driving predictions on the corresponding graph. Such graph elements may be determined based on the subset of denoised explain scores associated with the graph elements of the corresponding graph. The unfiltered graph elements (i.e., graph elements that remain after the filtering) of the corresponding graph of the first set of graphs 302A . . . 302N may constitute a subset of graph elements of the second set of graph elements 314A. For example, the processor 204 may determine a first subset of graph elements of the second set of graph elements 314A based on filtering of graph elements that may not be driving predictions on the first graph 302A. The unfiltered graph elements of the first graph 302A may constitute the first subset of graph elements of the second set of graph elements 314A. The graph elements selected for filtering may be determined based on denoised explain scores associated with the graph elements. The denoised explain scores may belong to the first subset of denoised explain scores for the first graph 302A. Similarly, an $N^{th}$ subset of graph elements of the second set of graph elements 314A may be determined by filtering graph elements that may not be driving predictions on the $N^{th}$ graph 302N. The unfiltered graph elements of the $N^{th}$ graph 302N may constitute the $N^{th}$ subset of graph elements of the second set of graph elements 314A. The graph elements selected for filtering may be determined based on denoised explain scores associated with the graph elements. The denoised explain scores may belong to the $N^{th}$ subset of denoised explain scores for the $N^{th}$ graph 302N.

At 316, a set of prediction driving graph elements associated with the first set of graphs 302A . . . 302N may be determined based on the first set of graph elements 306A and the second set of graph elements 314A. In at least one embodiment, the processor 204 may be configured to determine the set of prediction driving graph elements associated with the first set of graphs 302A . . . 302N based on the first set of graph elements 306A and the second set of graph elements 314A. The processor 204 may determine a first set of feature vectors for the first set of graph elements 306A. Each feature vector of the first set of feature vectors may correspond to a graph element of the first set of graph elements 306A. The processor 204 may further determine a second set of feature vectors for the second set of graph elements 314A. Each feature vector of the second set of feature vectors may correspond to a graph element of the second set of graph elements 314A.

In accordance with an embodiment, the processor 204 may be configured to apply unsupervised learning using a machine learning model on the first set of feature vectors and the second set of feature vectors. The unsupervised learning may be applied for determination of similarity between feature vectors of the first set of graph elements 306A (i.e., the first set of feature vectors) and the second set of graph elements 314A (i.e., the second set of feature vectors). Based on the unsupervised learning, features vectors of the first set of feature vectors and feature vectors of the second set of feature vectors may be grouped into a plurality of clusters for a clustered search. Each cluster of the plurality of clusters may include feature vectors of the first set of feature vectors, the second set of feature vectors, or the first set of feature vectors and the second set of feature vectors. The feature vectors grouped into a cluster of the plurality of clusters may be determined as similar based on unsupervised learning. For a graph element included in each of the first set of graph elements 306A and the second set of graph elements 314A, feature vectors corresponding to the graph element may be included in the first set of feature vectors and the second set of feature vectors. Further, the processor 204 may group feature vectors corresponding to different graph elements of the same graph of the first set of graphs 302A . . . 302N into a cluster based on a similarity between the feature vectors determined based on unsupervised learning.

For example, the first set of graphs 302A . . . 302N may include 4 graphs, i.e., a first graph 302A, a second graph 302B, a third graph 302C, and a fourth graph 302D. The first set of feature vectors may include 55 feature vectors that may correspond to 55 graph elements that may belong to different graphs of the first set of graphs 302A . . . 302N. The second set of feature vectors may include 37 feature vectors that may correspond to 37 graph elements that may belong to different graphs of the first set of graphs 302A . . . 302N. The 82 feature vectors may be grouped into 11 clusters such that the feature vectors grouped in each cluster may be similar.

The number of feature vectors grouped in each cluster may be different. The processor 204 may retain or reject a cluster of the plurality of clusters based on number of feature vectors grouped into the cluster. If the number of feature vectors grouped into the cluster is less than a threshold number of feature vectors, the cluster may be rejected. However, if the number of feature vectors grouped into the cluster is equal to or more than the threshold number of feature vectors, the cluster may be retained. For example, out of the 11 clusters, the processor 204 may reject 5 clusters and retain 6 clusters retained. In an example, the 6 retained clusters may include 60 feature vectors.

The processor 204 may further determine feature vectors corresponding to graph elements of each graph of the first set of graphs 302A . . . 302N that may be grouped in the retained clusters of the plurality of clusters. The determined feature vectors that correspond to the graph elements of each graph may be sorted into a bucket. Thus, the determined feature vectors may be sorted into "N" buckets if the count of graphs included in the first set of graphs 302A . . . 302N is "N". The graph elements corresponding to the determined feature vectors may constitute the set of prediction driving graph elements associated with the first set of graphs 302A . . . 302N.

At 318, graph data including explainability information associated with the first set of graphs 302A . . . 302N may be rendered based on the determined set of prediction driving elements. In at least one embodiment, the processor 204 may be configured to render graph data including the explainability information associated with the first set of graphs 302A . . . 302N based on the determined set of prediction driving elements. The explainability information may include user interpretable information and visualization. The user interpretable information may include graph elements of the determined set of prediction driving graph elements and explain scores associated with the graph elements. The visualization may include graphical user interface elements that may correspond to graphs of the first set of graphs 302A . . . 302N rendered on the user-end device 104 or the display device 210A. The graph elements included in the determined set of prediction driving graph elements may be annotated in those rendered graphs where the graph elements may belong.

If the first dataset, i.e., the first set of graphs 302A . . . 302N, corresponds to a finance-domain dataset, the explainability information associated with the first set of graphs 302A . . . 302N may facilitate a user to judiciously make financial decisions such as loan approval, identification of transaction frauds, or creation of transparency in financial decisions. If the first dataset corresponds to an ecommerce-domain dataset or a social network-domain dataset, the explainability information may facilitate accurate predictions, increase fidelity of user pattern detection in product purchase history, and generate correct recommendations. If the first dataset corresponds to a molecular chemistry-domain dataset, the explainability information may allow precise identification of atoms or bonds that drive molecules' chemical properties or collective comparison of a set of molecules for confirmation of cause of chemical properties of the set of molecules. If the first dataset corresponds to a genome sequence-domain dataset, the explainability information may allow determination correlation and previously unknown relationships between genes and offer explanation behind the relationships between the genes.

The embodiments of the disclosure may enable detection of noise in explanation results (i.e., the explain scores). The noise may be introduced in the explanation results due to incorrect identification of graph elements (i.e., node features, edge features, or graph structure) driving predictions on the graphs. The incorrectly identified graph elements may be detected since explain scores associated with the incorrectly identified graph elements may vary during each application of the predictive model and the graph explainer model 110. The embodiments of the disclosure may further allow determination of partial identification of prediction driving graph elements since the graph elements identified as prediction drivers may vary during each application of the predictive model or the graph explainer model 110. The embodiments of the disclosure may further facilitate global analysis of the explanation results instead of a localized interpretation (i.e., explanation result generation per prediction). The global analysis may be automatic and may not require involvement of subject-matter-experts. The global analysis may further enable mitigation of confirmation bias. The embodiments of the disclosure may incorporate multiple explainability techniques (such as, accumulation of explain scores and denoising of explain scores), which may target different graph elements (nodes, edges, or graph structure) as explanations for predictions. Further, the embodiments of the disclosure may enable integration of graph analytics and visualization frameworks, which, in turn, may allow sorting, plotting, and grouping of explanations and annotating graph elements of all graphs in a graph dataset. The embodiments of the disclosure may further provide an explainability metric to allow user to sort explanation results into different ranges. The embodiments of the disclosure may provide a user interface for annotating explanation results on original graph dataset (i.e., the graphs in the graph dataset).

FIG. 4 is a diagram that illustrates a flowchart of an example method for determination of a set of prediction driving graph elements in a graph dataset based on explain scores, in accordance with an embodiment of the disclosure. FIG. 4 is described in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, a first graph may be selected from a first set of graphs (for example, the first set of graphs 302A . . . 302N). In an embodiment, the processor 204 may be configured to select the first graph from the first set of graphs 302A . . . 302N. The first set of graphs 302A . . . 302N may be included in the received first dataset (refer 302 of FIG. 3). As an example, the graph 302A may be selected as the first graph.

At block 404, a first set of operations may be executed on the selected first graph (e.g., the graph 302A) to determine a first subset of explain scores and a first subset of graph elements of the first set of graph elements (for example, the first set of graph elements 306A) that may belong to the selected first graph (e.g., the graph 302A). In an embodiment, the processor 204 may be configured to execute the first set of operations on the selected first graph (e.g., the graph 302A) to determine the first subset of explain scores, and the first subset of graph elements of the first set of graph elements (for example, the first set of graph elements 306A) that may belong to the selected first graph (e.g., the graph 302A). The first set of graph elements 306A may include graph elements that may drive predictions on the first set of graphs 302A . . . 302N. The subset of graph elements of the first set of graph elements 306A may include graph elements of the graph 302A that may be driving predictions on the graph 302A. The first set of operations may be executed on the selected first graph (the graph 302A at this stage) to determine the graph elements driving the predictions on the graph 302A. The determination may be based on a set of explain scores. The set of explain scores may be determined based on an application of the graph explainer model 110 on predictions generated by the predictive model on the first set of graphs 302A . . . 302N. The first set of operations may include, a block 404A, a block 404B, a block 404C, a block 404D, a block 404E, a block 404F, a block 404G, a block 404H, and a block 404I.

At block 404A, a predefined number of subsets of initial explain scores may be determined based on applications of the graph explainer model 110 on predictions generated on the selected first graph. In an embodiment, the processor 204 may be configured to determine the predefined number of subsets of initial explain scores based on applications of the graph explainer model 110 on the predictions generated on the selected first graph (the graph 302A at this stage). Each initial explain score in each subset of initial explain scores of the predefined number of subsets of initial explain scores may be associated with a graph element of the selected first graph (e.g., the graph 302A).

Each subset of initial explain scores of the predefined number of subsets of initial explain scores may be determined based on an application of the predictive model on the graph 302A for generation of a prediction and an application of the graph explainer model 110 on the generated prediction. The processor 204 may generate multiple predictions (i.e., a predefined number of predictions) on the graph 302A based on multiple applications of the predictive model on the graph 302A. Further, a set of initial explain scores may be determined based on an application of the graph explainer model 110 on each prediction. Thus, multiple sets of initial explain scores, corresponding to the multiple predictions, may be determined.

At block 404B, initial explain scores in each subset of initial explain scores of the predefined number of subsets of initial explain scores may be normalized. In an embodiment, the processor 204 may be configured to normalize the initial explain scores in each subset of initial explain scores of the predefined number of subsets of initial explain scores. For example, the processor 204 may apply a min-max normalization technique to normalize the initial explain scores to a range of values between 0 and 1.

At block 404C, an accumulation of the normalized initial explain scores associated with each graph element in the predefined number of subsets of initial explain scores may be performed to obtain the first subset of explain scores of the set of explain scores. In an embodiment, the processor 204 may be configured to perform the accumulation of the normalized initial explain scores associated with each graph element in the predefined number of subsets of initial explain scores to obtain the first subset of explain scores of the set of explain scores. The normalized initial explain scores associated with each graph element in the multiple sets of normalized initial explain scores may be accumulated. Based on such accumulation, a consolidated set of normalized initial explain scores may be obtained. The consolidated set may correspond to the first subset of explain scores of the set of explain scores associated with graph elements of the first graph (e.g., the graph 302A). The first subset of explain scores may be referred as normalized subset of explain scores, since explain scores in the first subset of explain scores may be obtained based on the normalization of the initial explain scores.

At block 404D, explain scores in the first subset of explain scores may be sorted. In an embodiment, the processor 204 may be configured to sort explain scores in the first subset of explain scores. The explain scores may be sorted in an ascending order. The first explain score in the first subset of explain scores may be smallest and the last explain score in the first subset of explain scores may be largest. The graph elements of the graph 302A associated with larger explain scores may be driving the predictions on the graph 302A.

At block 404E, a slope associated with the sorted explain scores may be determined. In an embodiment, the processor 204 may be configured to determine the slope associated with the sorted explain scores. The slope may be determined for identification of graph elements that may be driving the predictions on the first graph (e.g., the graph 302A).

At block 404F, an inflection point associated with the sorted explain scores, for which the determined slope may be beyond a positive threshold slope, may be identified. In an embodiment, the processor 204 may be configured to identify the inflection point associated with the sorted explain scores, for which the determined slope may be beyond the positive threshold slope. The identification of the inflection point may allow identification of the first subset of graph elements of the first set of graph elements 306A driving the predictions on the first graph (e.g., the graph 302A). The inflection point may be identified based on the slope associated with the sorted explain scores of the first subset of explain scores.

At block 404G, graph elements beyond the identified inflection point may be identified as the first subset of graph elements of the first set of graph elements 306A. In an embodiment, the processor 204 may be configured to identify graph elements beyond the identified inflection point as the first subset of graph elements of the first set of graph elements 306A. The processor 204 may determine, based on the slope, a first transition from low derivative to high derivative. The graph elements of the first graph (e.g., the graph 302A) associated with sorted explain scores (of the first subset of explain scores) on the right of the inflection point may identified as prediction driving graph elements. The identified graph elements may constitute the first subset of graph elements of the first set of graph elements 306A. The graph elements on the left of the inflection point may be filtered and as those graph elements may not contribute to the predictions on the first graph (the graph 302A at this stage).

At block 404H, it may be determined whether the first set of graphs 302A . . . 302N includes at least one unprocessed graph. In an embodiment, the processor 204 may be configured to determine whether the first set of graphs 302A . . . 302N includes at least one unprocessed graph. For example, in the first instance of execution (i.e., the first iteration) of the first set of operations, processing of the graph 302A may be complete and "N-1" graphs, i.e., the graphs 302B . . . 302N of the first set of graphs 302A . . . 302N may be unprocessed.

At block 404I, a second graph (for example, the graph 302B), from the first set of graphs 302A . . . 302N, may be re-selected as the selected first graph, based on the first set of graphs 302A . . . 302N including the at least one unprocessed graph. In an embodiment, the processor 204 may be configured to re-select the second graph (i.e., the graph 302B), from the first set of graphs 302A . . . 302N, as the selected first graph, based on the first set of graphs 302A . . . 302N including the at least one unprocessed graph. Thus, at the current stage (i.e., at the end of the first iteration of the execution of the first set of operations), the graph 302B may be selected as the first graph, and the first set of operations may be executed in a second iteration.

At block 406, the set of explain scores and the first set of graph elements 306A may be obtained based on an iterative execution of the first set of operations until the first set of graphs 302A . . . 302N does not include any unprocessed graph. In an embodiment, the processor 204 may be configured to obtain the set of explain scores and the first set of graph elements 306A based on the iterative execution of the first set of operations until the first set of graphs 302A . . . 302N does not include any unprocessed graph. At each iteration, a graph (for example, the $N^{th}$ graph 302N) of the set of graphs 302A . . . 302N may be selected as the first graph and a subset (for example, an $N^{th}$ subset) of graph elements of the first set of graph elements 306A may be identified. The first set of graph elements 306A may be obtained when a subset of graph elements of the first set of graph elements 306A is identified for each graph of the first set of graphs 302A . . . 302N. Control may pass to end.

Although the flowchart 400 is illustrated as discrete operations, such as 402, 404 (including 404A-404I), and 406, the disclosure is not so limited. However, in certain embodiments, such discrete operations may be further divided into additional operations, combined into fewer operations, or eliminated, depending on the particular implementation without detracting from the essence of the disclosed embodiments.

Figure 5A:
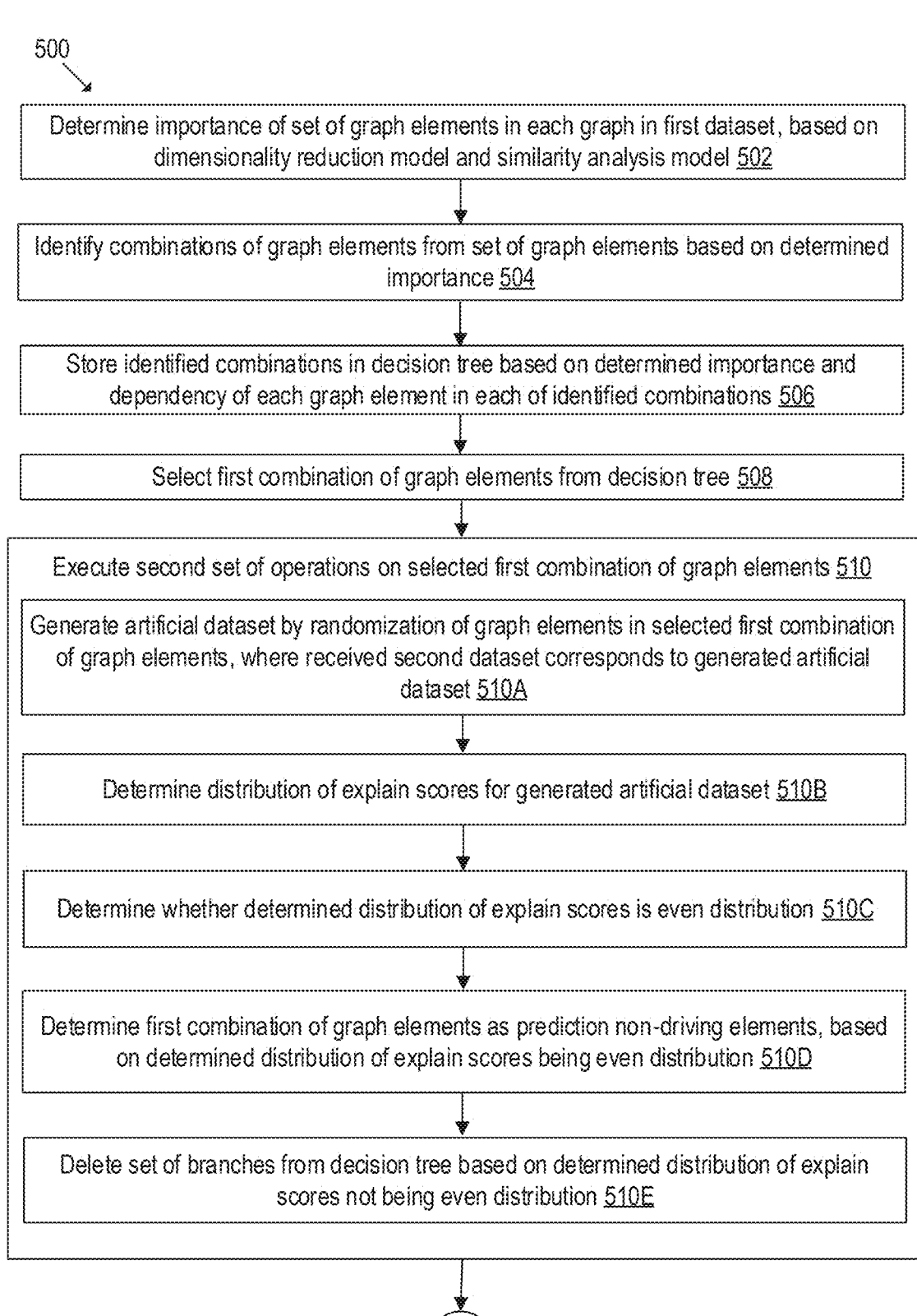

FIGS. 5A and 5B are diagrams that collectively illustrate a flowchart of an example method for determination of graph elements in a graph dataset that may not be driving predictions, in accordance with an embodiment of the disclosure. FIGS. 5A and 5B are described in conjunction with elements from FIG. 1, FIG. 2, FIG. 3, and FIG. 4. With reference to FIGS. 5A and 5B, there is shown a flowchart 500. The method illustrated in the flowchart 500 may start at 502 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 500 may be divided into additional blocks, combined into fewer blocks, or eliminated, depending on the particular implementation.

At block 502, an importance of a set of graph elements in each graph in the first dataset (i.e., the first set of graphs 302A . . . 302N) may be determined based on a dimensionality reduction model and a similarity analysis model. In an embodiment, the processor 204 may be configured to determine the importance of the set of graph elements in each graph in the first dataset (i.e., the first set of graphs 302A . . . 302N) based on the dimensionality reduction model and the similarity analysis model. The processor 204 may select a set of graph elements from each graph in the first dataset using auto ML and determine the importance of each graph element in the selected set of graph elements. The determination of the importance may be based on a principal component analysis and a similarity analysis on each graph element in the selected set of graph elements. In an embodiment, the dimensionality reduction model may correspond to a Principal Component Analysis (PCA) model.

At block 504, combinations of graph elements may be identified from the selected set of graph elements based on the determined importance. In an embodiment, the processor 204 may be configured to identify the combinations of graph elements from the selected set of graph elements based on the determined importance. From the set of graph elements, selected from each graph, a set of combinations of graph elements for the corresponding graph may be identified. For example, for the set of graph elements, selected from the first graph 302A using auto ML, a set of combinations of graph elements may be identified based on an importance of each graph element in the set of graph elements (determined based on the principal component analysis and similarity analysis of each graph element of the set of graph elements). Thus "N" sets of combinations may be identified for the first set of graphs 302A . . . 302N (i.e., the first dataset). Each set of combinations of the "N" sets of combinations may include at least one identified combination of graph elements.

At block 506, the identified combinations may be stored in a decision tree based on the determined importance and a dependency of each graph element in each of the identified combinations. In an embodiment, the processor 204 may be configured to store the identified combinations in the decision tree based on the importance and a dependency of each graph element in each of the identified combinations. The identified combinations, stored in the decision tree, may be sorted based on the importance and dependency of each of the graph elements.

At block 508, a first combination of graph elements may be selected from the decision tree. In an embodiment, the processor 204 may be configured to select the first combination of graph elements from the decision tree. The graph elements in the selected first combination of graph elements may belong to a particular graph (for example, the graph 302A) of the first set of graphs 302A . . . 302N. The first combination may be an identified combination of a set of identified combinations for the graph 302A.

At block 510, a second set of operations may be executed on the selected first combination of graph elements. In an embodiment, the processor 204 may be configured to execute the second set of operations on the selected first combination of graph elements. The second set of operations may include, a block 510A, a block 510B, a block 510C, a block 510D, a block 510E, a block 510F, a block 510G, and a block 510H.

At block 510A, an artificial dataset may be generated by randomization of graph elements in the selected first combination of graph elements. In an embodiment, the processor 204 may be configured to generate an artificial dataset by randomization of the graph elements in the selected first combination of graph elements. The second dataset (refer 308 in FIG. 3) may correspond to the artificial dataset. The processor 204 may randomize feature values of each graph element in the selected first combination of graph elements. Based on the randomization of the features of the graph elements of the first combination, a randomized graph corresponding to the graph 302A may be generated. The randomized graph may be a part of the artificial dataset.

At block 510B, a distribution of explain scores for the generated artificial dataset (which includes only the randomized graph corresponding to the graph 302A) may be determined. In an embodiment, the processor 204 may be configured to determine the distribution of explain scores for the generated artificial dataset. The processor 204 may apply the predictive model on the randomized graph to generate a prediction. Thereafter, the processor 204 may apply the graph explainer model 110 on the generated prediction to determine explain scores associated with explain scores associated with graph elements in the randomized graph.

At block 510C, it may be determined whether the determined distribution of explain scores is an even distribution. In an embodiment, the processor 204 may be configured to determine whether the determined distribution of explain scores is an even distribution.

At block 510D, the first combination of graph elements may be determined as prediction non-driving graph elements, based on the determined distribution of explain scores being the even distribution. In an embodiment, the processor 204 may be configured to determine the first combination of graph elements as prediction non-driving graph elements, based on the determined distribution of explain scores being the even distribution. The explain scores associated with prediction non-driving graph elements may contribute to noise in the first subset of explain scores (of the set of explain scores) that may be determined based on an application of the graph explainer model 110 on predictions generated on the graph 302A (since the graph elements in the first combination belong to the graph 302A). Thus, the first combination of graph elements may be used for generation of the first subset of noise scores of the set of noise scores associated with the first graph 302A (see 310 in FIG. 3).

At block 510E, a set of branches may be deleted from the decision tree, based on the determined distribution of explain scores not being the even distribution. In an embodiment, the processor 204 may be configured to delete the set of branches from the decision tree, based on the determined distribution of explain scores not being the even distribution. The deleted set of branches may include the first combination. The processor 204 may determine that the graph elements in the first combination may be driving predictions on the first graph 302A or that the determined distribution of explain scores associated with the graph elements in the first combination may be odd.

At block 510F, it may be determined whether the decision tree includes at least one unprocessed combination of graph elements. In an embodiment, the processor 204 may be configured to determine the decision tree includes at least one unprocessed combination of graph elements. For example, after the first iteration of the second set of operations, only the first combination for the graph 302A may be processed.

At block 510G, a second combination of graph elements may be re-selected from the decision tree as the selected first combination, based on the decision tree including the at least one unprocessed combination. In an embodiment, the processor 204 may be configured to re-select the second combination of graph elements from the decision tree as the selected first combination, based on the decision tree including the at least one unprocessed combination. The second combination of graph elements may be re-selected since at this stage (i.e., at the end of the first iteration of the second set of operations) only the first combination for the graph 302A may be the processed combination.

At block 512, identified combinations of graph elements may be determined as prediction non-driving graph elements based on the iterative execution of the second set of operations until the decision tree does not include any unprocessed combination. In an embodiment, the processor 204 may be configured to determine identified combinations of graph elements as prediction non-driving graph elements based on the iterative execution of the second set of operations until the decision tree does not include any unprocessed combination of graph elements. Thus, the processor 204 may determine combinations of graph elements that may not be driving predictions, i.e., prediction non-driving graph elements, for the first set of graphs 302A . . . 302N. The determined combinations may be used for determination of baseline noise that may be affecting explain scores associated with graph elements of each graph of the first set of graphs 302A . . . 302N. The distribution of explain scores, that may be determined based on randomized graphs (generated based on randomization of features of the determined combinations of graph elements) may be even. Control may pass to end.

Although the flowchart 500 is illustrated as discrete operations, such as 502, 504, 506, 508, 510 (510A-510G), and 512, the disclosure is not so limited. However, in certain embodiments, such discrete operations may be further divided into additional operations, combined into fewer operations, or eliminated, depending on the particular implementation without detracting from the essence of the disclosed embodiments.

FIG. 6 is a diagram that illustrates a flowchart of an example method for determination of a denoised explain scores based on a set of noise scores, in accordance with an embodiment of the disclosure. FIG. 6 is described in conjunction with elements from FIG. 1, FIG. 2, FIG. 3, FIG. 4, FIG. 5A, and FIG. 5B. With reference to FIG. 6, there is shown a flowchart 600. The method illustrated in the flowchart 600 may start at 602 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 600 may be divided into additional blocks, combined into fewer blocks, or eliminated, depending on the particular implementation.

At block 602, a set of baseline noise scores may be determined based on the application of the graph explainer model on the identified combinations of graph elements, determined as prediction non-driving graph elements. In an embodiment, the processor 204 may be configured to determine the set of baseline noise scores based on the application of the graph explainer model 110 on the identified combinations of graph elements that may be determined as prediction non-driving graph elements. The set of baseline noise scores may correspond to the set of noise scores. The set of baseline noise scores may include "N" subsets of baseline scores. Each subset of baseline scores (i.e., each subset of noise scores) may be determined based on an application of the predictive model on each combination of graph elements (determined as prediction non-driving graph elements) and an application of the graph explainer model 110 on a prediction generated by the predictive model based on the corresponding combination.

At block 604, noise components may be removed from the set of explain scores associated with the received first dataset to determine a set of noise removed scores, based on the determined set of baseline noise scores. In an embodiment, the processor 204 may be configured to remove noise components from the set of explain scores associated with the received first dataset to determine the set of noise removed scores, based on the determined set of baseline noise scores. The noise components may be introduced in the set of explain scores due to prediction non-driving graph elements in the received first dataset. The processor 204 may compute a subtraction of a baseline noise score of the set of baseline noise scores associated with each graph element of the first dataset from an explain score of the set of explain scores associated with the corresponding graph element of the first dataset, for determination of each noise removed score of the set of noise removed scores.

At block 606, the determined set of noise removed scores may be normalized and averaged. In an embodiment, the processor 204 may be configured to normalize and average the determined set of noise removed scores. The set of denoised explain scores may be determined further based on the normalization and the averaging of the determined set of noise removed scores. Control may pass to end.

Although the flowchart 600 is illustrated as discrete operations, such as 602, 604 and 606, the disclosure is not so limited. However, in certain embodiments, such discrete operations may be further divided into additional operations, combined into fewer operations, or eliminated, depending on the particular implementation without detracting from the essence of the disclosed embodiments.

FIG. 7 is a diagram that illustrates a flowchart of an example method for determination of a set of prediction driving graph elements based on feature vectors of graph elements, in accordance with an embodiment of the disclosure. FIG. 7 is described in conjunction with elements from FIG. 1, FIG. 2, FIG. 3, FIG. 4, FIG. 5A, FIG. 5B, and FIG. 6. With reference to FIG. 7, there is shown a flowchart 700. The method illustrated in the flowchart 700 may start at 702 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 700 may be divided into additional blocks, combined into fewer blocks, or eliminated, depending on the particular implementation.

At block 702, a set of feature vector clusters including feature vectors of the first set of feature vectors and the second set of feature vectors may be determined. In an embodiment, the processor 204 may be configured to determine a set of feature vector clusters including feature vectors of the first set of feature vectors and the second set of feature vectors. The processor 204 may cluster the set of feature vectors of the first set of feature vectors and the second set of feature vectors based on similarity between each pair of feature vectors of the first set of feature vectors, the second set of feature vectors, and the first set of feature vectors or the second set of feature vectors. The similarity may be determined via application of unsupervised learning (such as clustering (e.g., using K-Means clustering) using a machine learning model) on the first set of feature vectors and the second set of feature vectors.

At block 704, a set of vector components common to a first feature vector cluster of the set of feature vector clusters may be determined. In an embodiment, the processor 204 may be configured to determine a set of vector components (from the first set of feature vectors and the second set of feature vectors) that may be common to the first feature vector cluster of the set of feature vector clusters. The set of prediction driving graph elements may be determined based on the determined set of vector components.

For example, each cluster may have certain similar feature vectors, but the clusters may not be all exactly the same. For each graph (e.g., a "Graph 1" and a "Graph 10"), a feature vector of each node may be evaluated for similarity against feature vectors in each cluster (e.g., a Cluster "A" and a Cluster "B"), using a similarity metrics such as, Pearson Correlation. If the feature vector of each node in a graph (e.g., the "Graph 1") has a high correlation with respect to a particular cluster (e.g., the "Cluster A"), the graph may be assigned the particular cluster (i.e., the "Graph 1" may belong to the "Cluster A"). Using a dimensionality reduction technique (such as, Principle Component Analysis (PCA)), the common feature vectors in a cluster may be identified as the feature values that drive the prediction for the corresponding graph. For example, PCA of all feature vectors in the "Cluster A" may drive the prediction of the "Graph 1". Details of determination of the set of prediction driving graph elements are further provided, for example, in FIG. 3 (at 316). Control may pass to end.

Although the flowchart 700 is illustrated as discrete operations, such as 702 and 704, the disclosure is not so limited. However, in certain embodiments, such discrete operations may be further divided into additional operations, combined into fewer operations, or eliminated, depending on the particular implementation without detracting from the essence of the disclosed embodiments.

FIG. 8 is a diagram that illustrates a flowchart of an example method for rendering of explainability information associated with a graph dataset, in accordance with an embodiment of the disclosure. FIG. 8 is described in conjunction with elements from FIG. 1, FIG. 2, FIG. 3, FIG. 4, FIG. 5A, FIG. 5B, FIG. 6, and FIG. 7. With reference to FIG. 8, there is shown a flowchart 800. The method illustrated in the flowchart 800 may start at 802 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 800 may be divided into additional blocks, combined into fewer blocks, or eliminated, depending on the particular implementation.

At block 802, each prediction driving graph element of the determined set of prediction driving elements, associated with each of the first set of graphs (for example, the first set of graphs 302A . . . 302N), may be annotated. In an embodiment, the processor 204 may be configured to annotate each prediction driving graph element (for example, nodes, edges, or graph structures) of the determined set of prediction driving graph elements associated with each graph of the first set of graphs 302A . . . 302N. The annotations on each prediction driving graph element of the set of prediction driving graph elements may correspond to the explainability information associated with the first set of graphs 302A . . . 302N.

At block 804, graph data including explainability information associated with the first set of graphs 302A . . . 302N may be rendered. In an embodiment, the processor 204 may be configured to render the graph data including the explainability information associated with the first set of graphs 302A . . . 302N. The processor 204 may control the user-end device 104 or the display device 210A to render the explainability information. For example, if a node in a graph of the first set of graphs 302A . . . 302N is determined as a prediction driving graph element, the processor 204 may control the user-end device 104 or the display device 210A to render the graph with the node annotated. Control may pass to end.

Although the flowchart 800 is illustrated as discrete operations, such as 802 and 804, the disclosure is not so limited. However, in certain embodiments, such discrete operations may be further divided into additional operations, combined into fewer operations, or eliminated, depending on the particular implementation without detracting from the essence of the disclosed embodiments.

FIG. 9 is a diagram that illustrates a flowchart of an example method for determination of a global explainability metric for global interpretation of explainability information associated with predictions on a graph dataset, in accordance with an embodiment of the disclosure. FIG. 9 is described in conjunction with elements from FIG. 1, FIG. 2, FIG. 3, FIG. 4, FIG. 5A, FIG. 5B, FIG. 6, FIG. 7, and FIG. 8. With reference to FIG. 9, there is shown a flowchart 900. The method illustrated in the flowchart 900 may start at 902 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, a global explainability metric associated with each graph of the first set of graphs (for example, the first set of graphs 302A . . . 302N) may be determined. In an embodiment, the processor 204 may be configured to determine the global explainability metric associated with each graph of the first set of graphs 302A . . . 302N. The global explainability metric may be determined for mitigation of confirmation bias that explainability information associated with the first set of graphs 302A . . . 302N may be subjected to. The global explainability metric may be determined based on a cosine similarity metric. The processor 204 may be configured to determine a cosine similarity between with each pair of feature vectors corresponding to the prediction driving graph elements of the set of prediction driving graph elements associated with each of the first set of graphs 302A . . . 302N. Thus, a cosine similarity may be determined between feature vectors of the first set of feature vectors, feature vectors of the second set of feature vectors, and each feature vector first set of feature vectors and another feature vector of the second set of feature vectors.

At block 904, groups of similar graphs of the first set of graphs 302A . . . 302N may be generated based on the global explainability metric. In an embodiment, the processor 204 may be configured to generate groups of similar graphs of the first set of graphs 302A . . . 302N based on the determined global explainability metric. Based on the global explainability metric, graph elements that may not be contributors to predictions (or prediction non-driving graph elements) on the first set of graphs 302A . . . 302N may be classified in a first group. The feature vectors corresponding to the graph elements classified in the first group may be determined as similar based on a cosine similarity between the feature vectors. Similarly, graph elements that contribute to predictions (or prediction driving graph elements) on the first set of graphs 302A . . . 302N may be classified in a second group. The feature vectors corresponding to the graph elements classified in the second group may be determined as similar based on a cosine similarity between the feature vectors. The processor 204 may be configured to render graph data based on the generated group of similar graphs. The processor 204 may control the user-end device 104 or the display device 210A to render the graph data. The graph data may indicate the first group of graph elements and the second group of graph elements. Control may pass to end.

Although the flowchart 900 is illustrated as discrete operations, such as 902 and 904, the disclosure is not so limited. However, in certain embodiments, such discrete operations may be further divided into additional operations, combined into fewer operations, or eliminated, depending on the particular implementation without detracting from the essence of the disclosed embodiments.

Figure 10A:
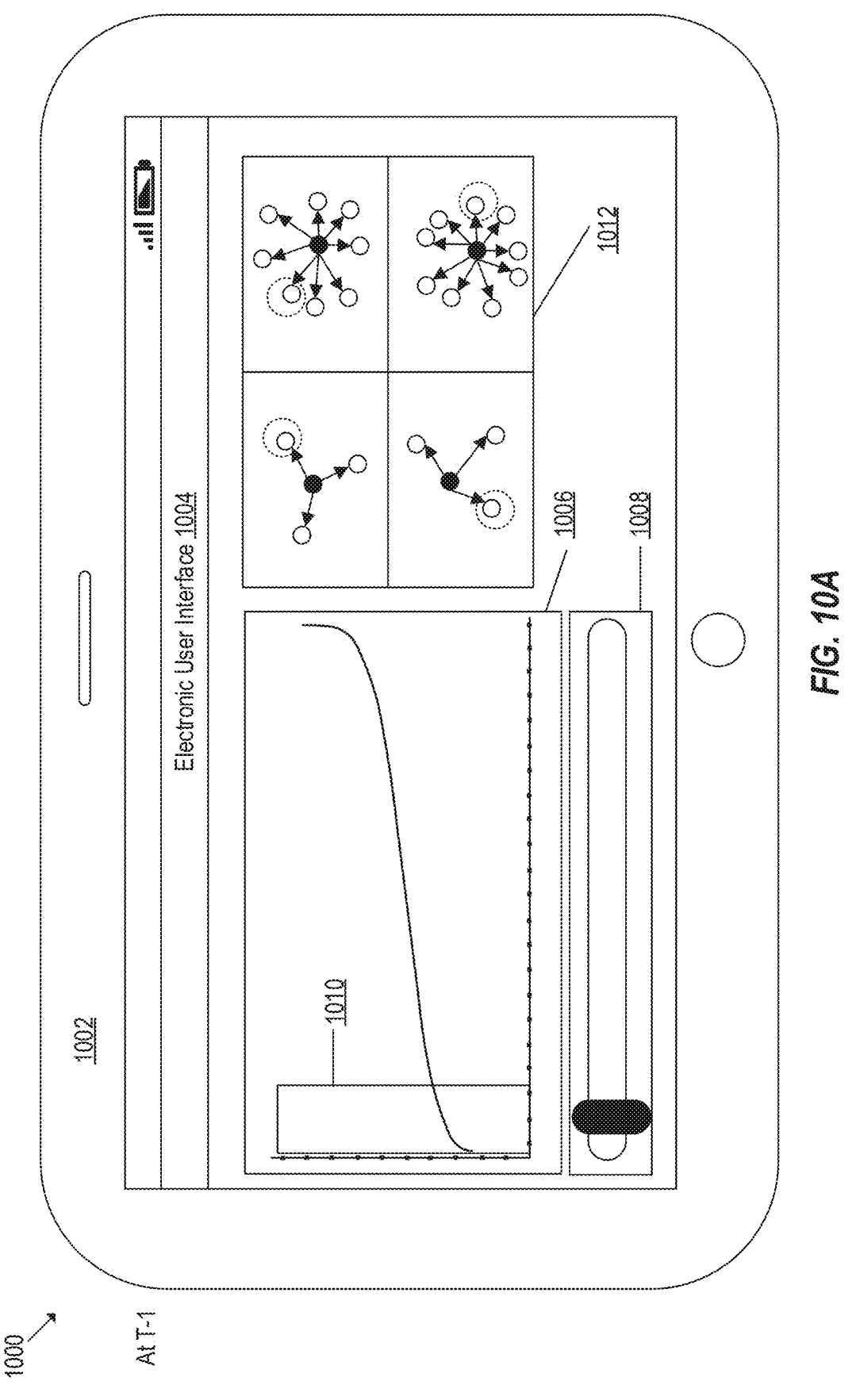
FIGS. 10A and 10B are diagrams that collectively illustrate an exemplary scenario for rendering of explainability information associated with a set of graphs.
Figure 10B:
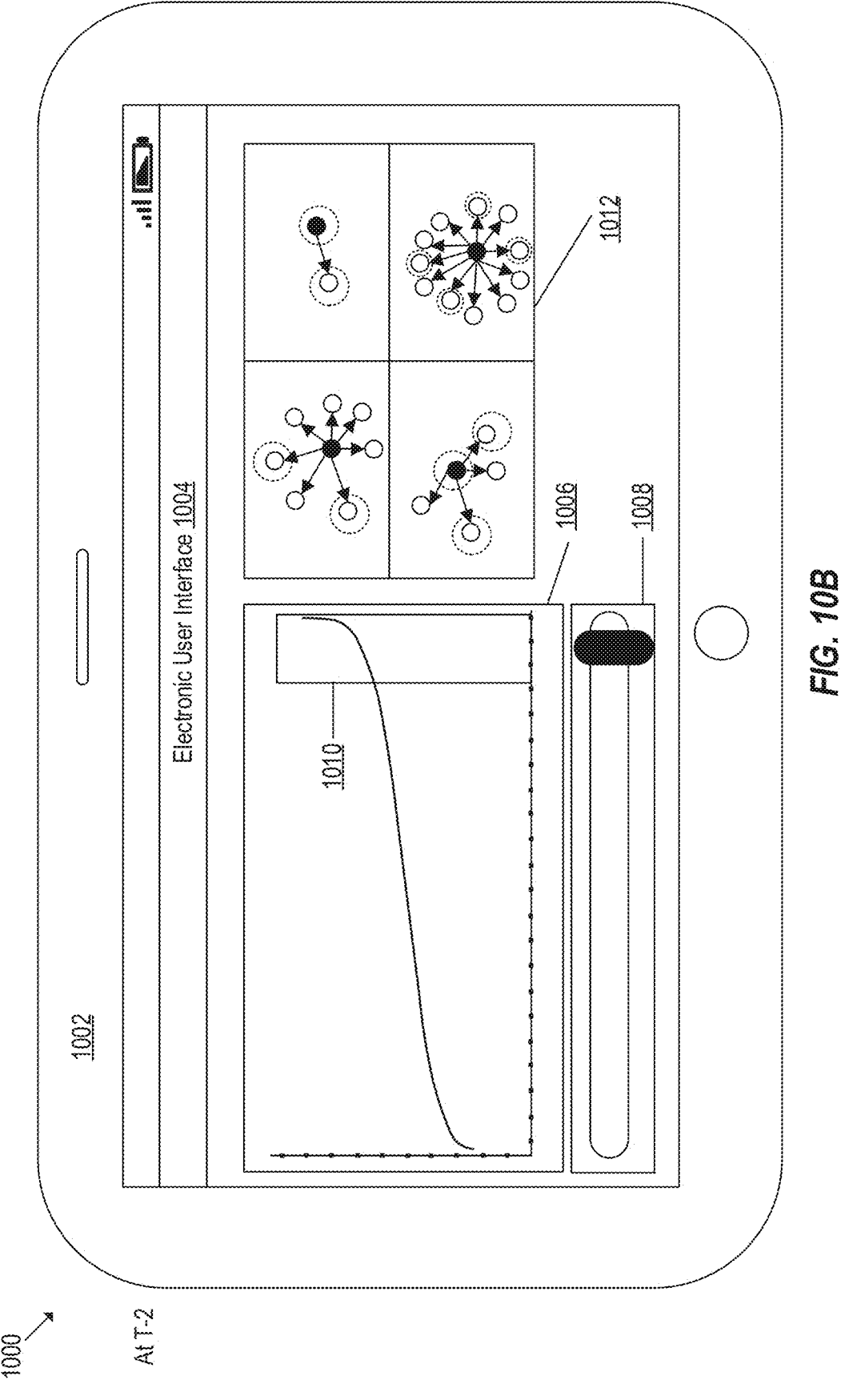

FIGS. 10A and 10B are diagrams that collectively illustrate an exemplary scenario for rendering of explainability information associated with a set of graphs, in accordance with at least one embodiment described in the present disclosure. FIGS. 10A and 10B are described in conjunction with elements from FIG. 1, FIG. 2, FIG. 3, FIG. 4, FIG. 5A, FIG. 5B, FIG. 6, FIG. 7, FIG. 8, and FIG. 9. With reference to FIGS. 10A and 10B, there is shown an exemplary scenario 1000. The exemplary scenario 1000 may include an electronic device 1002, which may be an exemplary implementation of the electronic device 102 of FIG. 1. The processor 204 may render an electronic UI 1004 on a display (for example, the display device 210A) of the electronic device 1002. The electronic UI 1004 may include four UI elements, viz., a first UI element 1006, a second UI element 1008, a third UI element 1010, and a fourth UI element 1012.

As shown in FIG. 10A, at a time instance T-1, the processor 204 may control the electronic UI 1004 to render explainability information associated with a set of graphs. The rendered explainability information may include graph data of a graph dataset that may include a set of graphs. The first UI element 1006 may correspond to the graph data. The X-axis of the graph data may be representative of graph elements of the graph dataset and the Y-axis of the graph data may be representative of contributions of the graph elements of the graphs to predictions on the set of graphs of the graph dataset. The contributions may be represented using explain scores associated with the graph elements of the graph dataset. The feature vectors of the graph elements of the set of graphs may be grouped based on a similarity between the feature vectors. The similarity may be determined based on a global explainability metric. The determination of the global explainability metric is described further, for example, in FIG. 9 (at 902).

The processor 204 may receive a first user input via the second UI element 1008. The second UI element 1008 may allow a user to select a set of graph elements of the graph dataset associated with explain scores that may be within a specific range. Based on the received first user input, the processor 204 may control a position of the third UI element

1010 across the graph data. For example, the received first user input may be indicative of a selection of a set of graph elements that may have minuscule contribution to predictions on the set of graphs in the graph dataset. The set of graph elements may be associated with lower explain scores. Based on the user input, the processor 204 may control the position of the third UI element 1010 to a left end of the X-axis of the graph data, as shown in FIG. 10A. The processor 204 may further control fourth UI element 1012 to render annotations on the set of graph elements (for example, nodes), based on the selection indicated in the received first user input. The fourth UI element 1012 may indicate the annotated nodes in each graph of the set of graphs in the graph dataset.

As shown in FIG. 10B, at a time instance T-2 after T-1, the processor 204 may receive a second user input via the second UI element 1008. Based on the received second user input, the processor 204 may control the position of the third UI element 1010 across the graph data. For example, the received second user input may be indicative of a selection of a set of graph elements that may have a significant contribution to predictions on the set of graphs the graph dataset. The set of graph elements may be associated with higher explain scores. Based on the user input, the processor 204 may adjust the position of the third UI element 1010 to a right end of the X-axis of the graph data, as shown in FIG. 10B. The processor 204 may further control fourth UI element 1012 to render annotations on the set of graph elements (for example, nodes), based on the selection indicated in the received second user input.

It should be noted that the scenario 1000 of FIGS. 10A and 10B are for exemplary purposes and should not be construed to limit the scope of the disclosure.

Figure 11B:
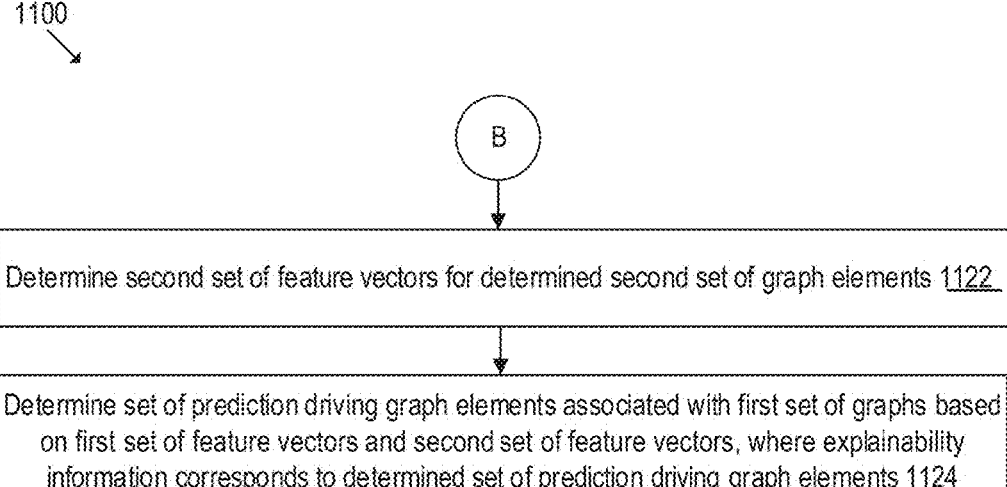

FIGS. 11A and 11B are diagrams that collectively illustrate a flowchart of an example method for global interpretation and visualization of graph explainability results, in accordance with an embodiment of the disclosure. FIGS. 11A and 11B are described in conjunction with elements from FIG. 1, FIG. 2, FIG. 3, FIG. 4, FIG. 5A, FIG. 5B, FIG. 6, FIG. 7, FIG. 8, FIG. 9, FIG. 10A, and FIG. 10B. With reference to FIGS. 11A and 11B, there is shown a flowchart 1100. The method illustrated in the flowchart 1100 may start at 1102 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1100 may be divided into additional blocks, combined into fewer blocks, or eliminated, depending on the particular implementation.

At block 1102, an electronic user interface (UI) that comprises one or more UI elements corresponding to graph data, including explainability information associated with a plurality of graphs, may be displayed. In an embodiment, the processor 204 may be configured to display the electronic UI that comprises the one or more UI elements corresponding to graph data including explainability information associated with the plurality of graphs. For example, the one or more UI elements may include a first set of UI elements through which the processor 204 may receive user inputs that may indicate a selection of a graph dataset. The one or more UI elements may further include a second set of UI elements that may render graph explainability information associated with graphs that may be included in a selected graph dataset.

At block 1104, a first user input indicative of a user-selection of a first set of graphs (for example, the first set of graphs 114A . . . 114N) from the plurality of graphs may be received via the displayed electronic UI. In an embodiment, the processor 204 may be configured to receive, via the displayed electronic UI, the first user input that may be indicative of a user-selection of the first set of graphs 114A . . . 114N from the plurality of graphs. For, example, the processor 204 may control the displayed electronic UI to render three graph datasets. The electronic UI may receive a user input, via an UI element rendered on the displayed electronic UI, indicative of selection of a graph dataset (amongst the three datasets). Details of reception of user inputs indicative of user-selection of a set of graphs, are further provided, for example, in FIG. 12.

At block 1106, a first dataset (for example, the first dataset 114) including the first set of graphs (for example, the first set of graphs 114A . . . 114N) may be received. In an embodiment, the processor 204 may be configured to receive the first dataset 114 including the first set of graphs 114A . . . 114N. The first dataset 114 may be received as a response to the user input indicative of the user-selection of the first set of graphs 114A . . . 114N (i.e., the first dataset 114).

At block 1108, a graph explainer model (for example, the graph explainer model 110) may be applied on the received first dataset 114 to determine a set of explain scores. In an embodiment, the processor 204 may be configured to apply the graph explainer model 110 on the received first dataset 114 to determine the set of explain scores. Details of application of the graph explainer model 110 for determination of the set of explain scores are further provided, for example, in FIG. 1, FIG. 3, and FIG. 4.

At block 1110, graph elements of each graph of the first set of graphs 114A . . . 114N may be filtered, to determine a first set of graph elements, based on the determined set of explain scores. In an embodiment, the processor 204 may be configured to filter graph elements of each graph of the first set of graphs 114A . . . 114N, to determine the first set of graph elements, based on the determined set of explain scores. Details of filtering of the first set of graphs 114A . . . 114N are further provided, for example, in FIG. 1, FIG. 3, and FIG. 4.

At block 1112, a second dataset (for example, the second dataset 116) that may include a set of randomized graphs may be generated based on the first set of graphs 114A . . . 114N. In an embodiment, the processor 204 may be configured to generate the second dataset 116 that may include the set of randomized graphs, based on the first set of graphs 114A . . . 114N. Details of generation of the set of randomized graphs are further provided, for example, in FIG. 1, FIG. 3, FIG. 5A, and FIG. 5B.

At block 1114, the graph explainer model 110 may be applied on the generated second dataset 116 to determine a set of noise scores. In an embodiment, the processor 204 may be configured to apply the graph explainer model 110 on the generated second dataset 116 to determine the set of noise scores. Details of determination of the set of noise scores are further provided, for example, in FIG. 1, FIG. 3, and FIG. 6.

At block 1116, the determined set of explain scores may be denoised, to determine a set of denoised explain scores, based on the determined set of noise scores. In an embodiment, the processor 204 may be configured to denoise the determined set of explain scores, to determine the set of denoised explain scores, based on the determined set of noise scores. Details of denoising of the set of explain scores are further provided, for example, in FIG. 1, FIG. 3 and FIG. 6.

At block 1118, graph elements of each graph of the first set of graphs 114A . . . 114N may be filtered, to determine a second set of graph elements, based on the determined set of denoised explain scores. In an embodiment, the processor 204 may be configured to filter graph elements of each graph of the first set of graphs 114A . . . 114N, to determine a second set of graph elements, based on the determined set of denoised explain scores. Details of determination of the second set of graph elements are further provided, for example, in FIG. 1, FIG. 3, FIG. 5A, and FIG. 5B.

At block 1120, a first set of feature vectors may be determined for the determined first set of graph elements. In an embodiment, the processor 204 may be configured to determine the first set of feature vectors for the determined first set of graph elements. Details of determination of the first set of feature vectors are further provided, for example, in FIG. 1, FIG. 3, and FIG. 7.

At block 1124, a second set of feature vectors may be determined for the determined second set of graph elements. In an embodiment, the processor 204 may be configured to determine the second set of feature vectors for the determined second set of graph elements. Details of determination of the second set of feature vectors are further provided, for example, in FIG. 1, FIG. 3, and FIG. 7.

At block 1124, a set of prediction driving graph elements, associated with the first set of graphs 114A . . . 114N, may be determined based on the first set of feature vectors and the second set of feature vectors. In an embodiment, the processor 204 may be configured to determine the set of prediction driving graph elements associated with the first set of graphs 114A . . . 114N based on the first set of feature vectors and the second set of feature vectors. The explainability information, associated with the first set of graphs 114A . . . 114N, may correspond to the determined set of prediction driving graph elements. Details of determination of the set of prediction driving graph elements are further provided, for example, in FIG. 1, FIG. 3 and FIG. 7. Control may pass to end.

Although the flowchart 1100 is illustrated as discrete operations, such as 1102, 1104, 1106, 1108, 1110, 1112, 1114, 1116, 1118, 1120, 1122, and 1124, the disclosure is not so limited. However, in certain embodiments, such discrete operations may be further divided into additional operations, combined into fewer operations, or eliminated, depending on the particular implementation without detracting from the essence of the disclosed embodiments.

Figure 12:
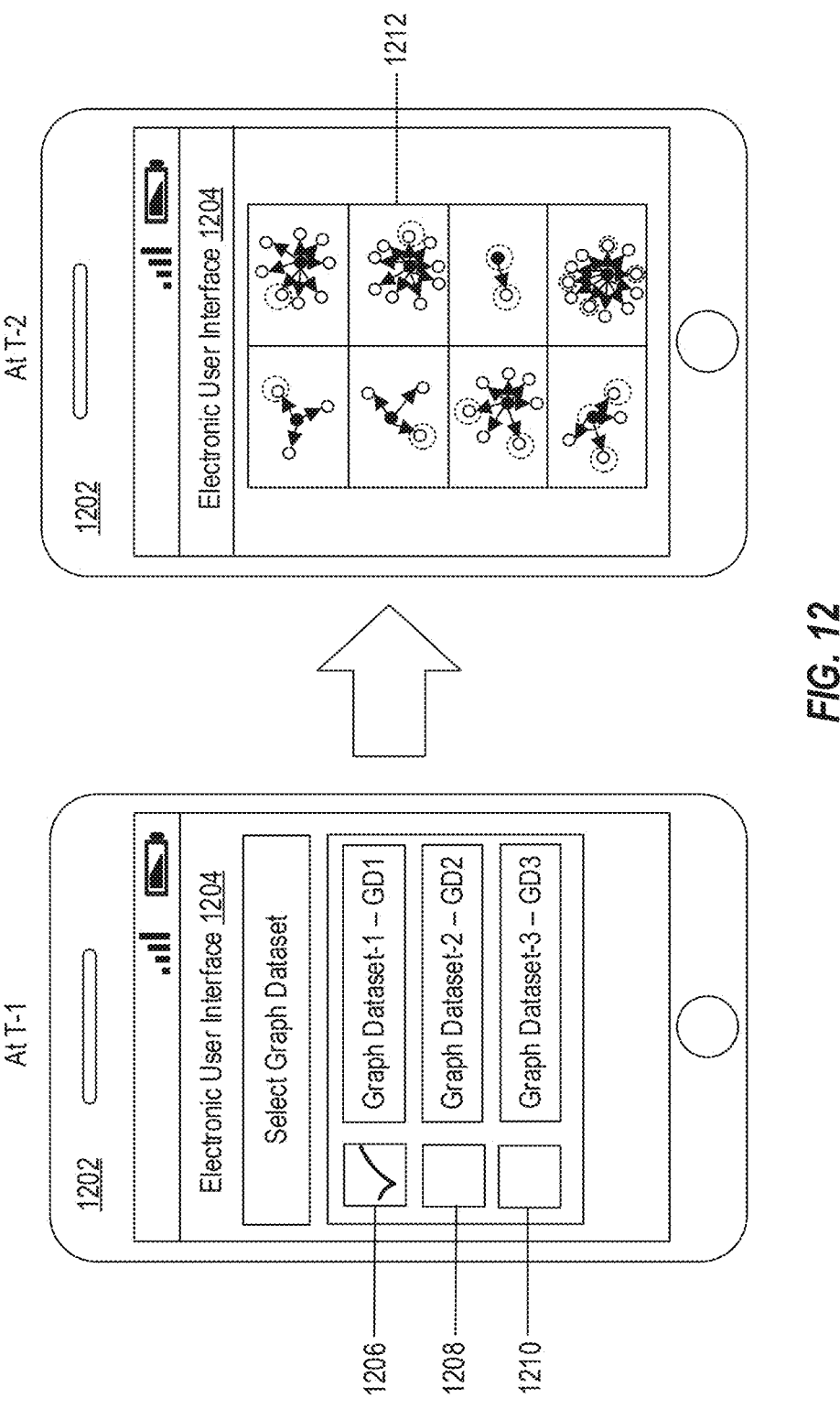
FIG. 12 is a diagram that illustrates an exemplary scenario for rendering of explainability information associated with graph elements of a graph dataset.

FIG. 12 is a diagram that illustrates an exemplary scenario for rendering of explainability information associated with graph elements of a graph dataset, in accordance with at least one embodiment described in the present disclosure. FIG. 1, FIG. 2, FIG. 3, FIG. 4, FIG. 5A, FIG. 5B, FIG. 6, FIG. 7, FIG. 8, FIG. 9, FIG. 10A, FIG. 10B, FIG. 11A, and FIG. 11B. With reference to FIG. 12, there is shown an exemplary scenario 1200. The exemplary scenario 1200 may include an electronic device 1202, which may be an exemplary implementation of the electronic device 102 of FIG. 1. The processor 204 may render an electronic UI 1204 on a display (for example, the display device 210A) of the electronic device 1202. The electronic UI 1204 may include multiple UI elements, i.e., UI elements 1206, 1208, and 1210, that enable selection of graph datasets. The electronic UI 1204 may further include a UI element 1212 corresponding to graph data including explainability information associated with a plurality of graphs. The plurality of graphs may include three graph datasets, viz., a graph dataset-1 (GD1), a graph dataset-2 (GD2), and a graph dataset-3 (GD3).

In accordance with an embodiment, at a time instance T-1, the processor 204 may receive a user input via the UI element 1206. The user input may be indicative of a user-selection of a first set of graphs (for example, the first set of graphs 114A . . . 114N) from the plurality of graphs. The first set of graphs 114A . . . 114N may be included in GD1. The processor 204 may be configured to determine a set of prediction driving graph elements in each graph of the selected first set of graphs 114A . . . 114N. In accordance with an embodiment at a time instance T-2 after T-1, the processor 204 may control the electronic UI 1212 to render the determined set of prediction driving graph elements associated with the first set of graphs 114A . . . 114N as explainability information. The UI element 1212 may include annotations as the determined set of prediction driving graph elements (for example, nodes) in the selected first set of graphs 114A . . . 114N.

It should be noted that the scenario 1200 of FIG. 12 is for exemplary purposes and should not be construed to limit the scope of the disclosure.

FIG. 13 is a diagram that illustrates a flowchart of an example method for global interpretation of graph learning explainability based on cumulative denoising and clustered search, in accordance with an embodiment of the disclosure. FIG. 13 is described in conjunction with elements from FIG. 1, FIG. 2, FIG. 3, FIG. 4, FIG. 5A, FIG. 5B, FIG. 6, FIG. 7, FIG. 8, FIG. 9, FIG. 10A, FIG. 10B, FIG. 11A, FIG. 11B, and FIG. 12. With reference to FIG. 13, there is shown a flowchart 1300. The method illustrated in the flowchart 1300 may start at 1302 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 1300 may be divided into additional blocks, combined into fewer blocks, or eliminated, depending on the particular implementation.

At block 1302, a first dataset (for example, the first dataset 114) including the first set of graphs (for example, the first set of graphs 114A . . . 114N) may be received. In an embodiment, the processor 204 may be configured to receive the first dataset 114 including the first set of graphs 114A . . . 114N. The first dataset 114 may be received as a response to the user input indicative of a user-selection of the first set of graphs 114A . . . 114N (i.e., the first dataset 114) from a plurality of graphs.

At block 1304, a graph explainer model (for example, the graph explainer model 110) may be applied on the received first dataset 114 to determine a set of explain scores. In an embodiment, the processor 204 may be configured to apply the graph explainer model 110 on the received first dataset 114 to determine the set of explain scores. Details of application of the graph explainer model 110 for determination of the set of explain scores are further provided, for example, in FIG. 1, FIG. 3, and FIG. 4.

At block 1306, graph elements of each graph of the first set of graphs 114A . . . 114N may be filtered, to determine a first set of graph elements, based on the determined set of explain scores. In an embodiment, the processor 204 may be configured to filter graph elements of each graph of the first set of graphs 114A . . . 114N, to determine the first set of graph elements, based on the determined set of explain scores. Details of filtering of the first set of graphs 114A . . . 114N based on the determined set of explain scores are further provided, for example, in FIG. 1, FIG. 3, and FIG. 4.

At block 1308, a second dataset (for example, the second dataset 116) that may include a set of randomized graphs may be generated based on the first set of graphs 114A . . . 114N. In an embodiment, the processor 204 may be configured to generate the second dataset 116 that may include the set of randomized graphs, based on the first set of graphs 114A . . . 114N. Details of generation of the set of randomized graphs are further provided, for example, in FIG. 1, FIG. 3, FIG. 5A, and FIG. 5B.

At block 1310, the graph explainer model 110 may be applied on the generated second dataset 116 to determine a set of noise scores. In an embodiment, the processor 204 may be configured to apply the graph explainer model 110 on the generated second dataset 116 to determine the set of noise scores. Details of determination of the set of noise scores are further provided, for example, in FIG. 1, FIG. 3, and FIG. 6.

At block 1312, the determined set of explain scores may be denoised, to determine a set of denoised explain scores, based on the determined set of noise scores. In an embodiment, the processor 204 may be configured to denoise the determined set of explain scores, to determine the set of denoised explain scores, based on the determined set of noise scores. Details of denoising of the set of explain scores are further provided, for example, in FIG. 1, FIG. 3 and FIG. 6.

At block 1314, graph elements of each graph of the first set of graphs 114A . . . 114N may be filtered, to determine a second set of graph elements, based on the determined set of denoised explain scores. In an embodiment, the processor 204 may be configured to filter graph elements of each graph of the first set of graphs 114A . . . 114N, to determine a second set of graph elements, based on the determined set of denoised explain scores. Details of determination of the second set of graph elements are further provided, for example, in FIG. 1, FIG. 3, FIG. 5A, and FIG. 5B.

At block 1316, a first set of feature vectors may be determined for the determined first set of graph elements. In an embodiment, the processor 204 may be configured to determine the first set of feature vectors for the determined first set of graph elements. Details of determination of the first set of feature vectors are further provided, for example, in FIG. 1, FIG. 3, and FIG. 7.

At block 1318, a second set of feature vectors may be determined for the determined second set of graph elements. In an embodiment, the processor 204 may be configured to determine the second set of feature vectors for the determined second set of graph elements. Details of determination of the second set of feature vectors are further provided, for example, in FIG. 1, FIG. 3, and FIG. 7.

At block 1320, a set of prediction driving graph elements, associated with the first set of graphs 114A . . . 114N, may be determined based on the first set of feature vectors and the second set of feature vectors. In an embodiment, the processor 204 may be configured to determine the set of prediction driving graph elements associated with the first set of graphs 114A . . . 114N based on the first set of feature vectors and the second set of feature vectors. Details of determination of the set of prediction driving graph elements are further provided, for example, in FIG. 1, FIG. 3 and FIG. 7.

At block 1322, graph data including explainability information associated with the first set of graphs 114A . . . 114N may be rendered based on the determined set of prediction driving graph elements. In an embodiment, the processor 204 may be configured to render graph data including explainability information associated with the first set of graphs 114A . . . 114N, based on the determined set of prediction driving graph elements. Details of rendering of the explainability information associated with the first set of graphs 114A . . . 114N are further provided, for example, in FIG. 1, FIG. 3 and FIG. 8, FIG. 9, FIG. 10A, FIG. 10B, FIG. 11A, FIG. 11B, and FIG. 12. Control may pass to end.

Although the flowchart 1300 is illustrated as discrete operations, such as 1302, 1304, 1306, 1308, 1310, 1312, 1314, 1316, 1318, 1320, and 1322, the disclosure is not so limited. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as, the example electronic device 102) to perform operations. The operations may include receiving a first dataset (for example, the first dataset 114) including a first set of graphs (for example, the first set of graphs 114A . . . 114N). The operations may further include applying a graph explainer model (for example, the graph explainer model 110) on the received first dataset 114 to determine a set of explain scores. The operations may further include filtering graph elements of each graph of the first set of graphs 114A . . . 114N, to determine a first set of graph elements, based on the determined set of explain scores. The operations may further include generating a second dataset 116 including a set of randomized graphs, based on the first set of graphs 114A . . . 114N. The operations may further include applying the graph explainer model 110 on the generated second dataset 116 to determine a set of noise scores. The operations may further include denoising the determined set of explain scores, to determine a set of denoised explain scores, based on the determined set of noise scores. The operations may further include filtering graph elements of each graph of the first set of graphs 114A . . . 114N, to determine a second set of graph elements, based on the determined set of denoised explain scores. The operations may further include determining a first set of feature vectors for the determined first set of graph elements. The operations may further include determining a second set of feature vectors for the determined second set of graph elements. The operations may further include determining a set of prediction driving graph elements associated with the first set of graphs 114A . . . 114N based on the first set of feature vectors and the second set of feature vectors. The operations may further include rendering graph data including explainability information associated with the first set of graphs 114A . . . 114N, based on the determined set of prediction driving graph elements.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:
receiving a first dataset including a first set of graphs;
applying a graph explainer model on the received first dataset to determine a set of explain scores;
filtering graph elements of each graph of the first set of graphs, to determine a first set of graph elements, based on the determined set of explain scores;
generating a second dataset including a set of randomized graphs, based on the first set of graphs;
applying the graph explainer model on the generated second dataset to determine a set of noise scores;

denoising the determined set of explain scores, to determine a set of denoised explain scores, based on the determined set of noise scores;
filtering graph elements of each graph of the first set of graphs, to determine a second set of graph elements, based on the determined set of denoised explain scores;
determining a first set of feature vectors for the determined first set of graph elements;
determining a second set of feature vectors for the determined second set of graph elements;
determining a set of prediction driving graph elements associated with the first set of graphs based on the first set of feature vectors and the second set of feature vectors; and
rendering graph data including explainability information associated with the first set of graphs, based on the determined set of prediction driving graph elements.

2. The method according to claim 1, further comprising:
selecting a first graph from the first set of graphs;
executing a first set of operations on the selected first graph to determine a first subset of explain scores, and a first subset of graph elements of the first set of graph elements that belong to the selected first graph, wherein the first set of operations includes:
determining a predefined number of subsets of initial explain scores based on applications of the graph explainer model on predictions generated on the selected first graph,
wherein each initial explain score in each subset of initial explain scores of the predefined number of subsets of initial explain scores is associated with a graph element of the selected first graph,
normalizing initial explain scores in each subset of initial explain scores of the predefined number of subsets of initial explain scores,
performing an accumulation of the normalized initial explain scores associated with each graph element in the predefined number of subsets of initial explain scores to obtain the first subset of explain scores of the set of explain scores,
sorting explain scores in the first subset of explain scores,
determining a slope associated with the sorted explain scores,
identifying an inflection point associated with the sorted explain scores for which the determined slope is beyond a positive threshold slope,
identifying graph elements beyond the identified inflection point as the first subset of graph elements of the first set of graph elements,
determining whether the first set of graphs includes at least one unprocessed graph, and
re-selecting a second graph, from the first set of graphs, as the selected first graph, based on the first set of graphs including the at least one unprocessed graph; and
obtaining the set of explain scores and the first set of graph elements based on the iterative execution of the first set of operations until the first set of graphs does not include any unprocessed graph.

3. The method according to claim 1, wherein the first set of graph elements includes graph elements that drive predictions on the first set of graphs.

4. The method according to claim 1, further comprising:
determining an importance of a set of graph elements in each graph in the first dataset, based on a dimensionality reduction model and a similarity analysis model;

identifying combinations of graph elements from the set of graph elements based on the determined importance;

storing the identified combinations in a decision tree based on the determined importance and a dependency of each graph element in each of the identified combinations;

selecting a first combination of graph elements from the decision tree;

executing a second set of operations on the selected first combination of graph elements, wherein the second set of operations includes:

generating an artificial dataset by randomization of graph elements in the selected first combination of graph elements, wherein the received second dataset corresponds to the generated artificial dataset, determining a distribution of explain scores for the generated artificial dataset, determining whether the determined distribution of explain scores is an even distribution, determining the first combination of graph elements as prediction non-driving graph elements, based on the determined distribution of explain scores being the even distribution, deleting a set of branches from the decision tree based on the determined distribution of explain scores not being the even distribution, determining whether the decision tree includes at least one unprocessed combination of graph elements, and re-selecting a second combination of graph elements from the decision tree as the selected first combination, based on the decision tree including the at least one unprocessed combination; and determining identified combinations of graph elements as prediction non-driving graph elements based on the iterative execution of the second set of operations until the decision tree does not include any unprocessed combination.

5. The method according to claim 4, wherein the dimensionality reduction model corresponds to a Principal Component Analysis (PCA) model.

6. The method according to claim 4, wherein the determined combinations of graph elements associated with even explain score distributions correspond to prediction non-driving graph elements.

7. The method according to claim 4, further comprising:

determining a set of baseline noise scores based on the application of the graph explainer model on the identified combinations of graph elements determined as prediction non-driving graph elements, wherein the set of baseline noise scores correspond to the set of noise scores;

removing noise components from the set of explain scores associated with the received first dataset to determine a set of noise removed scores, based on the determined set of baseline noise scores; and normalizing and averaging the determined set of noise removed scores, wherein the set of denoised explain scores is determined further based on the normalization and the averaging of the determined set of noise removed scores.

8. The method according to claim 1, wherein one or more feature vectors of the determined first set of feature vectors and the determined second set of feature vectors corresponds to the set of prediction driving graph elements.

9. The method according to claim 1, wherein the set of prediction driving graph elements are determined via unsupervised machine learning on the determined first set of feature vectors and on the determined second set of feature vectors.

10. The method according to claim 1, further comprising:

determining a set of feature vector clusters including feature vectors of the first set of feature vectors and the second set of feature vectors; and determining a set of vector components that are common to a first feature vector cluster of the set of feature vector clusters, wherein the set of prediction driving graph elements is determined further based on the determined set of vector components.

11. The method according to claim 1, further comprising:

annotating each prediction driving graph element of the determined set of prediction driving elements associated with each graph of the first set of graphs, wherein the explainability information corresponds to the annotations associated with the determined set of prediction driving graph elements.

12. The method according to claim 1, further comprising:

determining a global explainability metric associated with each graph of the first set of graphs; and generating groups of similar graphs of the first set of graphs based on the determined global explainability metrics, wherein the graph data is rendered further based on the generated group of similar graphs.

13. The method according to claim 12, further comprising:

determining a cosine similarity metric associated with each pair of feature vectors corresponding to prediction driving graph elements of the determined set of prediction driving graph elements associated with each of the first set of graphs, wherein the determination of the global explainability metrics is based on the determined cosine similarity metric.

14. The method according to claim 1, wherein the received first dataset corresponds to at least one of a finance-domain dataset, an ecommerce-domain dataset, a social network-domain dataset, a molecular chemistry-domain dataset, or a genome sequence-domain dataset.

15. One or more non-transitory computer-readable storage media configured to store instructions that, in response to being executed, cause an electronic device to perform operations, the operations comprising:

receiving a first dataset including a first set of graphs;

applying a graph explainer model on the received first dataset to determine a set of explain scores;

filtering graph elements of each graph of the first set of graphs, to determine a first set of graph elements, based on the determined set of explain scores;

generating a second dataset including a set of randomized graphs, based on the first set of graphs;

applying the graph explainer model on the generated second dataset to determine a set of noise scores;

denoising the determined set of explain scores, to determine a set of denoised explain scores, based on the determined set of noise scores;

filtering graph elements of each graph of the first set of graphs, to determine a second set of graph elements, based on the determined set of denoised explain scores;

determining a first set of feature vectors for the determined first set of graph elements;

determining a second set of feature vectors for the determined second set of graph elements;

determining a set of prediction driving graph elements associated with the first set of graphs based on the first set of feature vectors and the second set of feature vectors; and rendering graph data including explainability information associated with the first set of graphs, based on the determined set of prediction driving graph elements.

16. The one or more non-transitory computer-readable storage media according to claim 15, the operations further comprising:

selecting a first graph from the first set of graphs;

executing a first set of operations on the selected first graph to determine a first subset of explain scores, and a first subset of graph elements of the first set of graph elements that belong to the selected first graph, wherein the first set of operations includes:

determining a predefined number of subsets of initial explain scores based on applications of the graph explainer model on predictions generated on the selected first graph, wherein each initial explain score in each subset of initial explain scores of the predefined number of subsets of initial explain scores is associated with a graph element of the selected first graph, normalizing initial explain scores in each subset of initial explain scores of the predefined number of subsets of initial explain scores, performing an accumulation of the normalized initial explain scores associated with each graph element in the predefined number of subsets of initial explain scores to obtain the first subset of explain scores of the set of explain scores, sorting explain scores in the first subset of explain scores, determining a slope associated with the sorted explain scores, identifying an inflection point associated with the sorted explain scores for which the determined slope is beyond a positive threshold slope, identifying graph elements beyond the identified inflection point as the first subset of graph elements of the first set of graph elements, determining whether the first set of graphs includes at least one unprocessed graph, and re-selecting a second graph, from the first set of graphs, as the selected first graph, based on the first set of graphs including the at least one unprocessed graph; and obtaining the set of explain scores and the first set of graph elements based on the iterative execution of the first set of operations until the first set of graphs does not include any unprocessed graph.

17. The one or more non-transitory computer-readable storage media according to claim 15, the operations further comprising:

determining an importance of a set of graph elements in each graph in the first dataset, based on a dimensionality reduction model and a similarity analysis model;

identifying combinations of graph elements from the set of graph elements based on the determined importance;

storing the identified combinations in a decision tree based on the determined importance and a dependency of each graph element in each of the identified combinations;

selecting a first combination of graph elements from the decision tree;

executing a second set of operations on the selected first combination of graph elements, wherein the second set of operations includes:

generating an artificial dataset by randomization of graph elements in the selected first combination of graph elements, wherein the received second dataset corresponds to the generated artificial dataset, determining a distribution of explain scores for the generated artificial dataset, determining whether the determined distribution of explain scores is an even distribution, determining the first combination of graph elements as prediction non-driving graph elements, based on the determined distribution of explain scores being the even distribution, deleting a set of branches from the decision tree based on the determined distribution of explain scores not being the even distribution, determining whether the decision tree includes at least one unprocessed combination of graph elements, and re-selecting a second combination of graph elements from the decision tree as the selected first combination, based on the decision tree including the at least one unprocessed combination; and determining identified combinations of graph elements as prediction non-driving graph elements based on the iterative execution of the second set of operations until the decision tree does not include any unprocessed combination.

18. The one or more non-transitory computer-readable storage media according to claim 17, wherein the determined combinations of graph elements associated with even explain score distributions correspond to prediction non-driving graph elements.

19. The one or more non-transitory computer-readable storage media according to claim 17, the operations further comprising:

determining a set of baseline noise scores based on the application of the graph explainer model on the identified combinations of graph elements determined as prediction non-driving graph elements, wherein the set of baseline noise scores correspond to the set of noise scores;

removing noise components from the set of explain scores associated with the received first dataset to determine a set of noise removed scores, based on the determined set of baseline noise scores; and normalizing and averaging the determined set of noise removed scores, wherein the set of denoised explain scores is determined further based on the normalization and the averaging of the determined set of noise removed scores.

20. An electronic device, comprising:

a memory configured to store instructions; and a processor, coupled to the memory, configured to execute the instructions to perform a process comprising:

displaying an electronic user interface (UI) that comprises one or more UI elements corresponding to graph data including explainability information associated with a plurality of graphs;

receiving, via the displayed electronic UI, a first user input indicative of a user-selection of a first set of graphs from the plurality of graphs;

receiving a first dataset including the first set of graphs;

applying a graph explainer model on the received first dataset to determine a set of explain scores;

filtering graph elements of each graph of the first set of graphs, to determine a first set of graph elements, based on the determined set of explain scores;

generating a second dataset including a set of randomized graphs, based on the first set of graphs;

applying the graph explainer model on the generated second dataset to determine a set of noise scores;

denoising the determined set of explain scores, to determine a set of denoised explain scores, based on the determined set of noise scores;

filtering graph elements of each graph of the first set of graphs, to determine a second set of graph elements, based on the determined set of denoised explain scores;

determining a first set of feature vectors for the determined first set of graph elements;

determining a second set of feature vectors for the determined second set of graph elements; and determining a set of prediction driving graph elements associated with the first set of graphs based on the first set of feature vectors and the second set of feature vectors, wherein the explainability information corresponds to the determined set of prediction driving graph elements.

* * * * *